(12) United States Patent
Neugebauer

(10) Patent No.: US 8,477,092 B2
(45) Date of Patent: Jul. 2, 2013

(54) LOW POWER ACTIVE MATRIX DISPLAY

(75) Inventor: Charles F. Neugebauer, Los Altos, CA (US)

(73) Assignee: Store Electronic Systems SA, Argenteuil (FR)

( * ) Notice: Subject to any disclaimer, the term of this patent is extended or adjusted under 35 U.S.C. 154(b) by 1276 days.

(21) Appl. No.: 11/949,736

(22) Filed: Dec. 3, 2007

(65) Prior Publication Data

US 2008/0136765 A1   Jun. 12, 2008

Related U.S. Application Data

(60) Provisional application No. 60/868,250, filed on Dec. 1, 2006, provisional application No. 60/884,155, filed on Jan. 9, 2007, provisional application No. 60/893,336, filed on Mar. 6, 2007, provisional application No. 60/894,883, filed on Mar. 14, 2007.

(51) Int. Cl.
   *G09G 3/36*   (2006.01)
(52) U.S. Cl.
   USPC ............................................................ 345/98
(58) Field of Classification Search
   USPC .................................... 345/87–100, 204–205
   See application file for complete search history.

(56) References Cited

U.S. PATENT DOCUMENTS

| | | | |
|---|---|---|---|
| 4,623,908 A | 11/1986 | Oshima et al. | |
| 4,870,396 A | 9/1989 | Shields | |
| 4,946,259 A | 8/1990 | Matino et al. | |
| 5,506,598 A * | 4/1996 | Shimada et al. | 345/92 |
| 5,701,136 A | 12/1997 | Huq et al. | |
| 5,903,249 A | 5/1999 | Koyama et al. | |
| 6,278,426 B1 * | 8/2001 | Akiyama | 345/97 |
| 6,858,989 B2 | 2/2005 | Howard | |
| 7,714,826 B2 * | 5/2010 | Jang et al. | 345/98 |
| 7,821,478 B2 * | 10/2010 | Tsuchida | 345/76 |
| 7,965,263 B2 * | 6/2011 | Parikh et al. | 345/76 |

FOREIGN PATENT DOCUMENTS

| | | |
|---|---|---|
| JP | 60263122 A | 12/1985 |
| WO | WO 2004/088628 A1 | 10/2004 |

OTHER PUBLICATIONS

Shiau, Miin-Shyue, et al. "Reduce High Voltage Stress Time on Gate Driver Circuits of Integrated TFT-LCD Panels", Taiwan Display Conf., Jul. 15-16, 2006, 5 pp.

* cited by examiner

*Primary Examiner* — Sumati Lefkowitz
*Assistant Examiner* — Rodney Amadiz
(74) *Attorney, Agent, or Firm* — Blakely Sokoloff Taylor & Zafman

(57) ABSTRACT

Described herein are systems and methods for stress avoidance and stress compensation in low power Liquid Crystal Displays (LCDs). In an exemplary embodiment, two or more transistors in series are used to hold charge on an LCD pixel. To avoid negative stress on the transistors, the transistors are alternately driven to an "off" state so that no one transistor sees a long "off" time. In another embodiment, stress on transistors of a display circuit are measured and controlled negative stress is applied to the transistors to compensate for the measured stress.

12 Claims, 34 Drawing Sheets

- M5 "on"

LOW POWER ACTIVE MATRIX DISPLAY

RELATED APPLICATIONS

This application claims the benefit of Provisional Application No. 60/868,250 filed on Dec. 1, 2006, Provisional Application No. 60/884,155 filed on Jan. 9, 2007, Provisional Application No. 60/893,336 filed on Mar. 6, 2007, and Provisional Application No. 60/894,883 filed on Mar. 14, 2007.

FIELD

The disclosure relates to sensor low power active matrix displays.

BACKGROUND INFORMATION

Low power displays are essential system components of most mobile electronic devices. The display subsystem is often one of the largest consumers of battery power as well as one of the most expensive components in many of these devices. The display industry has made continuous progress improving the visual performance, power consumption and cost through device and system architecture innovations. However, there is a class of important applications that require additional significant improvements in power and cost to become technically feasible and financially viable.

The dominant display technology for mobile devices, computer monitors and flat panel TVs is currently amorphous silicon hydrogenated thin film transistor (a-Si:H TFT) liquid crystal, also known generally as active matrix LCD technology. Advanced manufacturing technologies support a highly efficient worldwide production engine with capacity in the tens of millions of square meters of flat panel displays per year. The most common system architecture today consists of a simple array of TFT pixels on a glass panel that are driven by off-glass driver ICs. Each row and column of the TFT pixel array requires a driver pin in the conventional off-glass driver arrangement. Thousands of high voltage driver pins are needed even for relatively modest display resolutions. For a large display modules (e.g. as found in a 37" diagonal LCD TV) the cost of the driver ICs as a percentage of the overall display module cost is relatively low (e.g. 10%). For small displays, however, which increasingly require high resolution fine pitch pixels, the cost of driver ICs dominates the TFT module cost.

It has long been a goal of the flat panel industry to integrate the drive electronics onto the flat panel substrate using native TFT transistors to replace some or all of the functions conventionally handled in off-glass driver ICs. One significant barrier to integrating driver circuits is the poor performance of the a-Si:H TFT devices. Compared to single-grain silicon CMOS technology a-Si TFTs have very low electrical mobility which limits the speed and drive capability of the transistors on the glass. Additionally, the a-Si TFT transistors can accumulate large threshold voltage shifts and subthreshold slope degradations over time and can only meet product lifetime requirements by imposing strict constraints on the on-off duty cycle and bias voltages of the transistors. "Electrical Instability of Hydrogenated Amorphous Silicon Thin-Film Transistors for Active-Matrix Liquid-Crystal Displays" and "Effect of Temperature and Illumination on the Instability of a-Si:H Thin-Film Transistors under AC Gate Bias Stress" give a good overview of the gate bias stress induced threshold shifts and subthreshold slope degradations seen in a-Si:H TFTs.

Any integrated a-Si driver scheme has to address the threshold shift due to bias stress that is seen when positive and negative gate voltages are applied to the TFT devices. Because the positive and negative stress accumulation processes are due to fundamentally different device physics phenomena, they have very different accumulation rates and sensitivities to gate drive waveforms. To first order within the range of driving waveforms seen in typical flat panel refresh circuitry, positive stress is not strongly dependent on the frequency content of the gate waveform and accumulates relatively rapidly as a function of the integrated "on" time the gate sees. As positive stress increases, the voltage threshold of the TFT device is typically increased. TFT circuits typically have a maximum allowable positive stress beyond which the threshold shifts become too large for proper function.

Negative stress, in contrast, is very frequency dependent, accumulating more slowly at higher frequencies and typically manifests as both a negative threshold shift and a subthreshold slope degradation. To accumulate significant negative stress, the gate of a typical a-Si TFT needs an unbroken stretch of negative gate voltage (e.g. 20 ms or more for typical a-Si:H TFT devices). In conventionally scanned TFT flat panel displays, the gate voltage is positive only for a very small time (e.g. one line time, about 15 us every 16.600 ms frame; about 0.1% duty cycle) and negative for the rest of the frame period (e.g. 16.585 ms or about 99.9% of the frame period). The positive and negative gate voltage levels for such a conventional a-Si panel are typically chosen to balance the positive and negative stress effects to achieve a long operating life (e.g. >100 k hours at 70° C.). Each stress component (positive and negative) taken on its own typically results in a much shorter operational life (e.g. as short as 10 k hours); only the fine tuned balance of positive and negative stress achieves the desired operating lifetime. Developing integrated column and row drivers for a-Si TFT technology is therefore very problematic as the stress impact of duty cycle, voltage and frequency content of all the internal signals must be considered individually. As a result, only the simplest logic structures (e.g. shift registers) with low duty cycles and large threshold shift margins have been implemented in a-Si.

Another integration constraint for a-Si:H TFTs is the lack of a complementary device (e.g. a P-type FET) in conventional a-Si processes which is necessary for more complex logic functions and higher integration.

Despite these limitations, integrated drivers have been fabricated using a-Si technology with limited success. "Reliable Integrated a-Si Select Line Driver for 2.2-in. QVGA TFT-LCD" describes a display with integrated select (row) line drivers; while functional the reported lifetime is only 20,000 hrs (about 2.3 yrs) with a threshold shift of 15V, indicating that a substantial design voltage margin (i.e. 15V) is required which increases system power and driver IC voltage range significantly. Additional work reported in "High-Resolution Integrated a-Si Row Driver Circuits", "Reliable Integrated a-Si Select Line Driver for 2.2-in. QVGA TFT-LCD", and "Design of integrated Drivers with Amorphous Silicon TFTs for Small Displays. Basic Concepts" indicates some progress with integrated a-Si TFT row scanning circuits at high voltages and low duty cycles but substantial integration of both row and column drivers in a-Si with reasonable device lifetime has not been achieved to date. The display drive techniques and circuits described herein address this need for higher integration of driver functions using on-glass TFT devices while substantially reducing the deleterious effects of bias stress.

To overcome the a-Si device limitations, low temperature polysilicon (LTPS) processing has been developed to provide transistors with higher mobilities and much better stability under stress conditions that can successfully integrate driver IC functions onto the flat panel substrate. However, the additional processing steps (e.g. laser rapid thermal annealing), expensive equipment (e.g. for finer lithography) and increased mask count (approximately twice the mask count of an a-Si:H TFT process) raise the cost of an LTPS substrate significantly above an a-Si:H TFT substrate. Hence LTPS usage is generally considered economical only in high resolution small screen applications where the higher cost is outweighed by the integration savings and feature benefits (e.g. increased brightness, reduced form factor, higher dot pitch).

Even with improved devices such as LTPS and driver integration, the power consumption of LCDs is often too high for a significant class of applications that require a constantly active display. This class of displays is primarily used in a reflective mode to conserve power although operation with device-generated lighting (e.g. backlight or sidelight) is often a product requirement. Numerous applications such as a mobile phone's secondary or outer display, general public signage, numerous consumer devices (e.g. MP3 players, alarm clocks, etc.), electronic books, retail electronic shelf labels, etc. often require displays that show relatively static information but remain visible for the majority of the time the device is used. For devices whose primary utility is based on the display of information (e.g. mobile email, e-books, marketing messages) such utility is enhanced by display technologies that allow longer active display times between recharges. The displays described herein are also directed to such applications.

SUMMARY

A TFT flat panel system is disclosed that integrates some row drive functions on the display substrate to reduce the number of drive pins required for the flat panel.

A TFT flat panel system is disclosed that integrates some column drive functions on the display substrate to reduce the number of drive pins required for the flat panel.

An integrated driver flat panel display system is also disclosed that achieves long term reliability when implemented with a-Si TFTs.

An integrated driver flat panel display system is also disclosed that achieves data independent bias stress on the driver TFT devices.

An integrated driver flat panel display system that demultiplexes high voltage signals while maintaining very low voltage bias stress is disclosed.

An integrated single level TFT demultiplexer is disclosed that incorporates a capacitive memory element to preserve the demultiplexer state.

An integrated multiple level TFT demultiplexer is disclosed that incorporates a capacitive memory element to preserve the demultiplexer state.

An integrated TFT demultiplexer with programming and operational phases is disclosed.

A display system that monitors the stress condition of multiple classes of TFT devices is also disclosed.

A display system that generates a negative stress modulation through temporal modulation of the drive waveforms is also disclosed.

A display system that generates a negative stress modulation through amplitude modulation of the drive waveforms is also disclosed.

A display system that generates a negative stress modulation through both temporal and amplitude modulation of the drive waveforms is also disclosed.

A method of TFT positive stress compensation with a negative stress modulation system is also disclosed.

A method of display refresh that minimizes power dissipation on a flat panel is also disclosed.

Further objects, aspects, and advantages of the present teachings will be readily understood after reading the following description with reference to the drawings and the appended claims.

BRIEF DESCRIPTION OF THE DRAWINGS

FIG. 19b shows a representative timing diagram of the row demultiplex sub-circuit of FIG. 19a.

GLOSSARY OF TERMS

The following abbreviations are utilized in the following description, which abbreviations are intended to have the meanings provided as follows:
a-Si—amorphous silicon
AC—alternating current
ACF—anisotropic conductive film
ADC—analog to digital converter
CMOS—complementary MOS (both P and N type FETs available)
COB—chip on board
COF—chip on film or flex
COG—chip on glass
DC—direct current
ECB—electrically controlled birefringence
ESL—electronic shelf label
FET—field effect transistor
HTN—hyper twisted nematic
IC—integrated circuit
LCD—liquid crystal display
LTPS—low temperature polysilicon
MOS—metal oxide semiconductor
MTN—mixed-mode twisted nematic
NMOS—N-channel MOS
OCB—optically compensated bend
PDLC—polymer dispersed liquid crystal
RGB—red, green, blue
RTN—reflective twisted nematic
STN—super twisted nematic
TFT—thin film transistor
$V_{GS}$—gate-source voltage

DETAILED DESCRIPTION

Each of the additional features and teachings disclosed below may be utilized separately or in conjunction with other features and teachings to provide improved wireless sensing systems and methods for designing and using the same. Representative examples, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the claims. Therefore, combinations of features and steps disclosed in the following detail description may not be necessary to practice the concepts described herein in the broadest sense, and are instead taught merely to particularly describe representative examples of the present teachings.

In addition, it is expressly noted that all features disclosed in the description are intended to be disclosed separately and independently from each other for the purpose of original disclosure, as well as for the purpose of restricting the subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
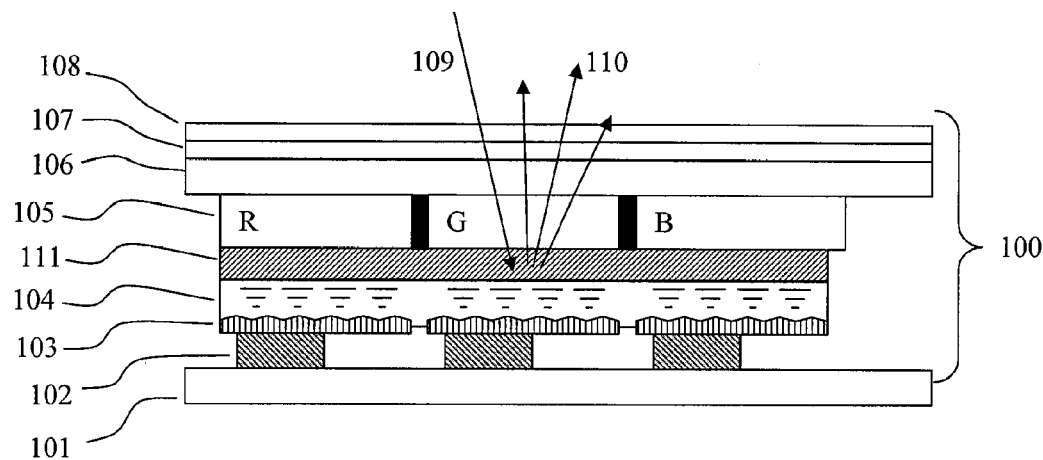
FIG. 1 shows a representative reflective TFT LCD configuration.

FIG. 1 shows a simplified cross section of a reflective single polarizer TFT LCD flat panel display 100. The control circuitry 102 is fabricated on a substrate 101. Control circuitry 102 may be implemented preferably in an a-Si process but can alternatively be implemented using LTPS processing or any thin-film switch-capable backplane technology. Substrate 101 can be glass, plastic, quartz, metal, or any other substrate capable of supporting switching device fabrication. Electrode 103 can be formed by lithographic and/or chemical processes and can be textured to diffusely reflect ambient light. Liquid crystal display material 104 sits in between the top and bottom plates. Color filters 105 and a top plate transparent conductor 111 are deposited on the top substrate 106. A retardation film or quarter wave plate 107 can be placed on top of the upper substrate 106. A diffusing polarizer 108 completes the LCD stack 100. In typical operation incident light 109 is polarized, filtered and diffusely reflected by the LCD stack 100 to create a reflected image 110.

Figure 2:
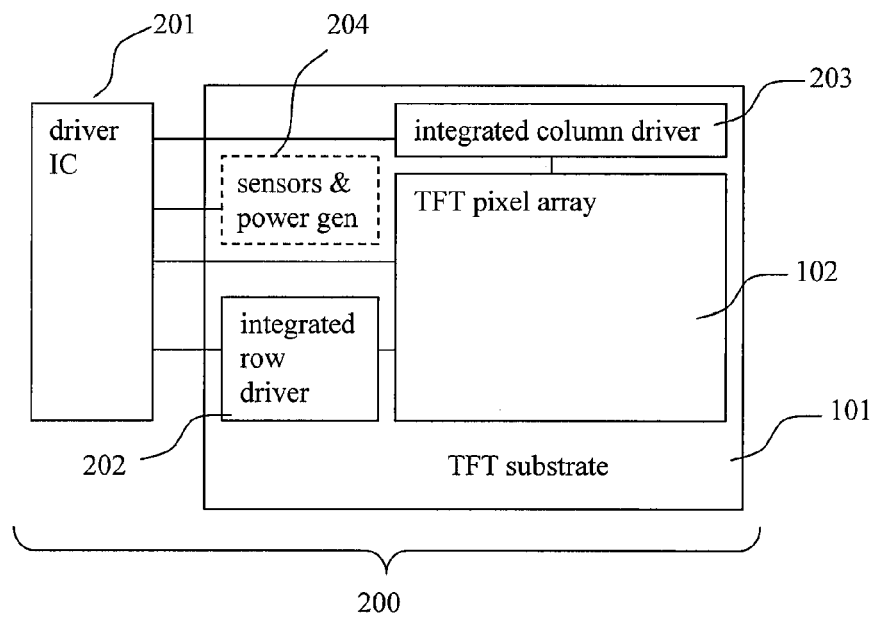
FIG. 2 shows a representative block diagram of a TFT LCD electrical system.

Alternative active display configurations other than that shown in FIG. 1, such as dual polarizer reflective, transmissive, transflective, backlit, sidelit, guest host, electrically controlled birefringent, RTN, PDLC, electrophoretic and other alternate liquid crystal and/or other display technologies that require an active backplane can benefit from the present teachings. The specific description herein of a reflective LCD incorporating the present teachings does not limit the scope of the present teachings in their application to alternative display materials and technologies FIG. 2 shows a block diagram of the electrical drive system of the flat panel display 200. TFT substrate 101 incorporates a TFT pixel array 102, a integrated column driver 203 and an integrated row driver 202. An off-substrate driver IC 201 provides control signals to the TFT pixel array 102, the integrated row driver 202 and the integrated column driver 203. Optional circuitry 204 such as threshold monitoring sensors and/or power conversion circuits can also be integrated in TFT technology on the substrate 101.

Figure 3:
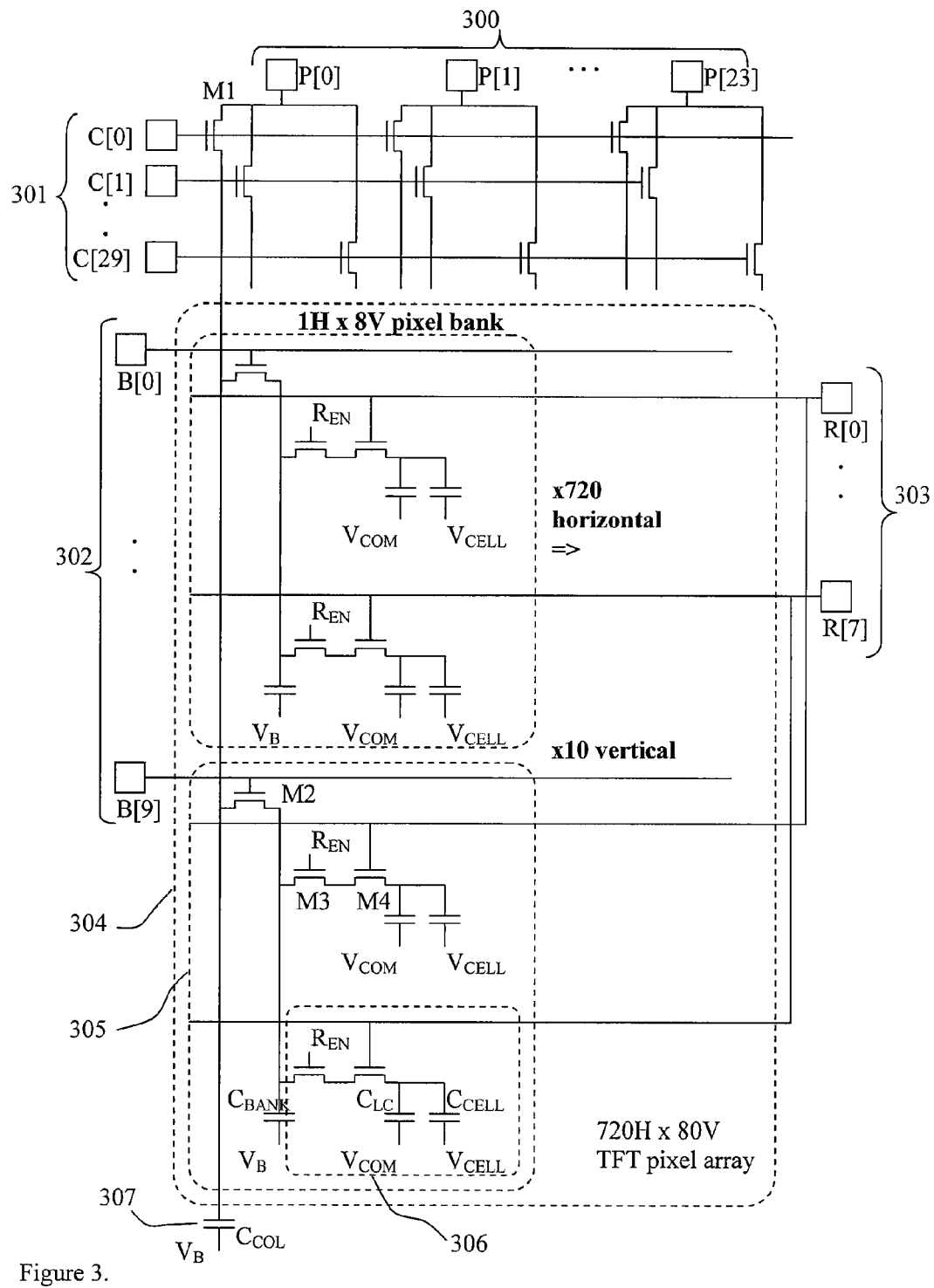
FIG. 3 shows a representative circuit diagram of the TFT substrate.

FIG. 3 shows an electrical diagram of the integrated column driver 203, the integrated row driver 202 and the TFT pixel array 102 304 for an example display with 240×80 RGB stripe pixels. Those skilled in the art can apply the present teachings to many alternative pixel resolutions and control bus widths directly; the choice of 240×80 is for illustration only and does not limit the scope of the claims to specific resolutions or signal bus widths.

In FIG. 3, pins P[23:0] 300 supply the LCD control voltages that are driven into the array 304. Column demultiplex TFTs are controlled by column select signals C[29:0] 301. By applying select signals C[29:0] 301 in sequence, a time sequence of voltages on P[23:0] 300 can be stored on the each of the column storage capacitors, $C_{COL}$ 307. Each column of the TFT pixel array 102 is comprised of ten banks of eight pixels each 305 and a column storage capacitor $C_{COL}$ 307. Each bank 305 contains eight pixels 306 and is selected by ten bank select signals B[9:0] 302. Within each bank, a given row of pixels can be selected using row select signals R[7:0] 303. Each pixel 306 contains circuitry to control the LCD pixel voltage as well as counteract bias stress on the pixel's TFTs.

Figure 4:
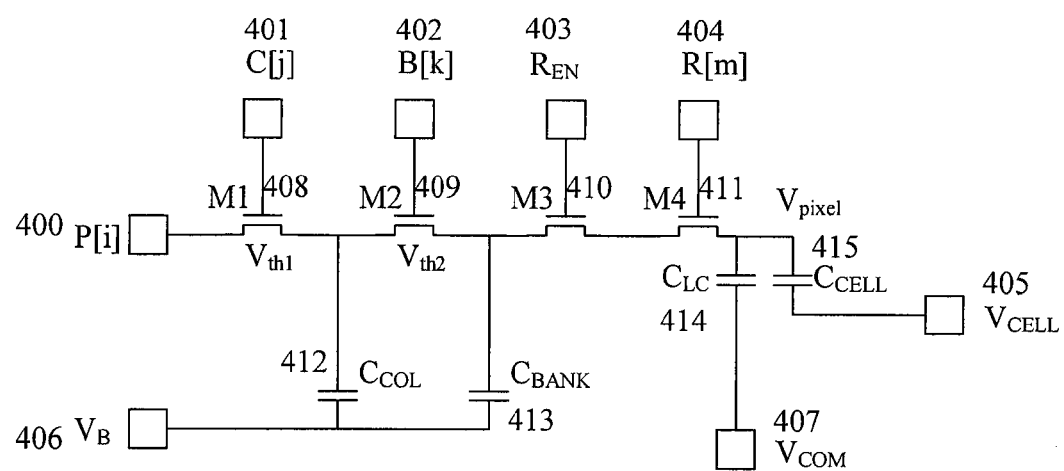
FIG. 4 shows a representative equivalent circuit for a single TFT pixel.

FIG. 4 shows a single pixel's electrical conduction and control paths from the input/output connection points of the TFT substrate 101. Pixel source voltage P[i] 400 is connected through M 1408 to a temporary hold cap $C_{COL}$ 412 when column select gate signal C[j] 401 is pulsed high. Bank select signal B[k] 402 drives the gate of M2 409 to connect the column storage capacitor $C_{COL}$ 307 to the bank storage capacitor $C_{BANK}$ 413. Row enable signal $R_{EN}$ 403 and row select signal R[m] 404 control TFTs M3 410 and M4 411 that connect bank capacitor $C_{BANK}$ 413 to the LCD pixel control node, $V_{pixel}$. The LCD is modeled as a simple capacitor $C_{LC}$ 414 whose back plate is on the opposing substrate of the LCD 106 and held at $V_{COM}$ 407. An optional hold capacitance $C_{CELL}$ 415 can optionally have a driven capacitance back plate voltage, $V_{CELL}$ 405, to reduce voltage driver swing requirements. In addition or in the alternative, the $C_{CELL}$ hold capacitance 415 can have a back plate voltage that is one of the driven gate lines within the array. The operation of these TFTs and capacitors is described below.

Figure 5:
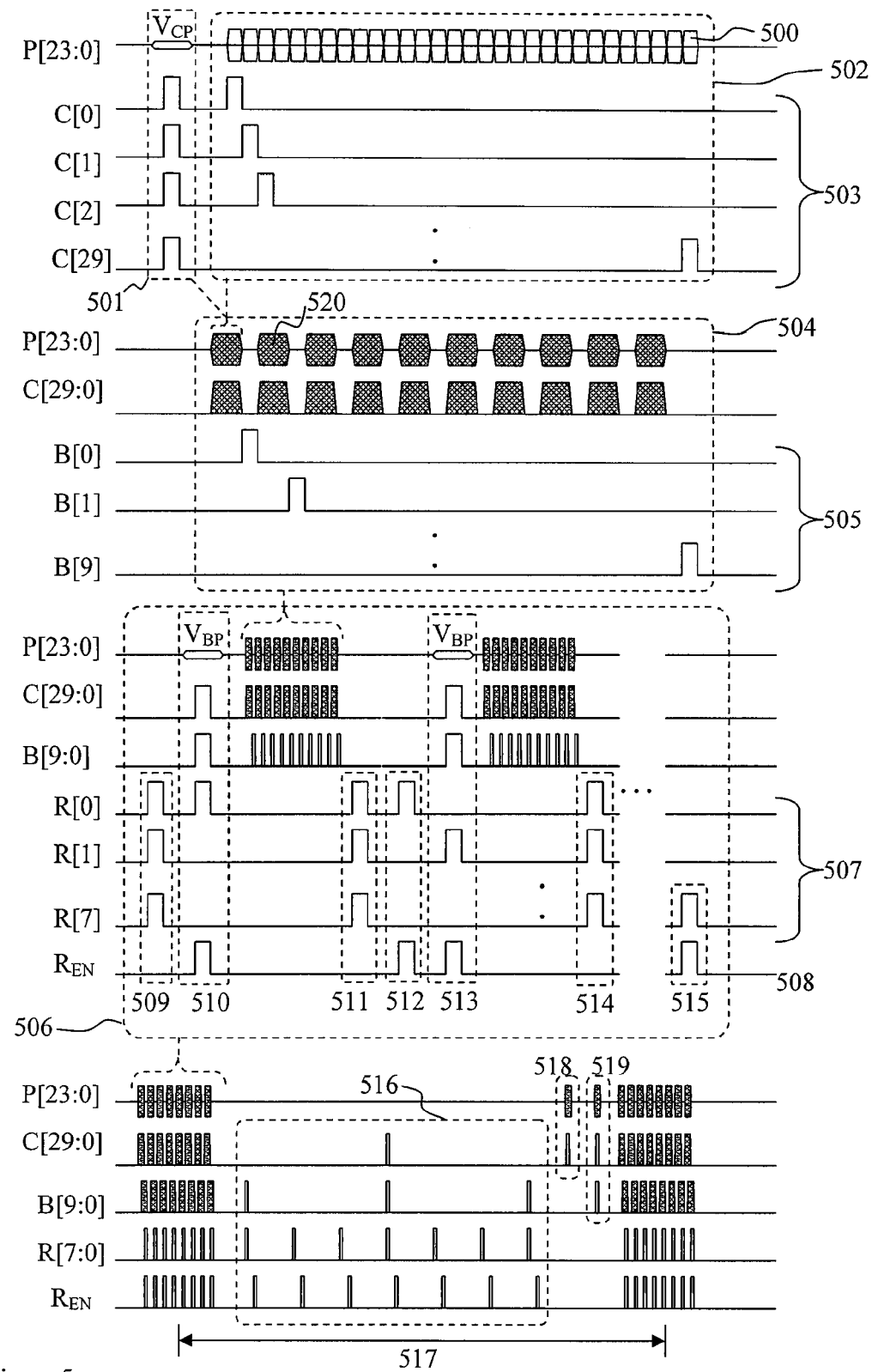
FIG. 5 shows a representative diagram of signal timing waveforms.

FIG. 5 shows a set of four timing diagrams of the flat panel control signals in a preferred embodiment of the present teachings. Each timing diagram represents a different timescale; from top to bottom the time scales are progressively longer (i.e. zooming out). The top set of timing waveforms 501 502 show a column load operation 520 that stores a set of desired voltages onto an array of column storage capacitors $C_{COL}$ 307 412. Pixel source voltages P[23:0] 300 400 are driven with pixel level bipolar voltages 500 representing (although not necessarily equal to) the desired final voltage state of a set of pixels or a precharge voltage $V_{CP}$ depending on the operation required in the pixel array. The timing signal group 501 is performed prior to all column scan sequences 502 to reset the state of the column storage capacitors $C_{COL}$ 307 412 to a known precharge voltage $V_{CP}$. In one embodiment, the column precharge voltage is the same as the $V_{COM}$ 407 voltage. In another embodiment, the voltage $V_{CP}$ depends on the state of the pixel inversion method (e.g. frame, line, bank, column, sub-block or dot inversion). The precharge voltage $V_{CP}$ can be chosen to minimize the required swing at the P[i] pins 400 of the substrate to effect a given magnitude variation at the individual LCD pixel control nodes, $V_{pixel}$. Due to charge sharing in later operations (e.g. the transfer of charge from $C_{COL}$ 412 to $C_{BANK}$ 413), the voltage swing magnitude will be modified by the ratio of the sharing capacitances, the initial voltage conditions, the gate-drain capacitance, gate voltage swing, charge splitting and additional parasitic capacitances in the system, among other effects. As a result, the driven source voltages P[i] 300 400 500 are preferentially pre-distorted to compensate for the voltage modifications expected in the TFT circuit of FIG. 4 so that the pixel node voltages $V_{pixel}$ achieve the desired levels.

During the column scan timing group 502, the C[j] lines 401 503 are pulsed sequentially and sample the voltages at P[j] pins 400 500 onto the column storage caps $C_{COL}$ 412 307. At the end of the column precharge 501 and column scan 502 operations, each column storage capacitor $C_{COL}$ 307 412 has been programmed to an independent desired voltage.

The second group of timing signals 504 shown in FIG. 5 contains ten column load operations as described above and acts to load the bank capacitors $C_{BANK}$ 413. The exact number of column load operations required for such a bank load operation 504 is dictated by the display resolution and designer choices on the partition of columns, banks, pixels and rows; the present teachings are not limited to a particular number of column load operations nor the exact number and/or sequence of scanning pulses on the column demultiplexing selection gates C[29:0] 401. After each column load operation 501 502 a bank select signal 505 causes the programmed $V_{COL}$ capacitors 307 412 to charge share with the $V_{BANK}$ capacitors 413 and transfer the desired pixel information closer to the desired pixel.

The third group of timing signals 506 in FIG. 5 shows a complete frame load operation that provides an update of all pixel voltages $V_{pixel}$ in the frame. The frame load operation 506 is comprised of a series of eight bank load operations 504. Starting from the left of the frame load operation 506, the first operation is preferentially a row gate negative stress blocking operation 509 in which all or some of the row lines R[m] 303 404 are pulsed to a positive voltage to prevent the accumulation of negative threshold shift in the row select TFTs 411. By breaking up the negative gate voltage periods, the accumulation of negative threshold voltage shift can be reduced and controlled. The second operation 510 in the third group 506 is a combined bank and first row precharge operation that enables the column select gates C[29:0] 401, the bank select gates B[9:0] 402, the row enable signal $R_{EN}$ 403 and the display row signal that will be programmed next R[m] 404. Source voltage pins P[23:0] are driven with a bank precharge voltage $V_{BP}$ that in one embodiment is the same as the $V_{COM}$ voltage. In another embodiment, the voltage $V_{BP}$ depends on the state of the pixel inversion method (e.g. frame, line, bank, column, sub-block or dot inversion). By precharging the bank hold capacitor $C_{BANK}$ voltage to a known value, prior sample feedthrough is suppressed and the required voltage swing at P[23:0] to effect a given change at the pixels is minimized. Predistortion of the P[23:0] voltages to accommodate charge sharing, stray capacitances, gate-drain coupling, initial conditions, DC balance, etc. can preferentially be applied by the driver IC 201. The third operation within the frame load operation 506 is a bank load operation 504 as described above. Since the bank load operation is always preceded by a bank precharge operation, the voltage range required at P[23:0] 400 is minimized. The fourth operation 511 of the frame load 506 happens after the bank load operation 504 and is a negative stress blocking operation 511 for the row TFTs similar to 509. The fifth operation 512 finally transfers the bank of stored voltages to the desired row of pixels by pulsing the desired row gate signal R[m] 404 and $R_{EN}$ 403 simultaneously causing the selected row of pixel capacitances 414 415 to charge share with the corresponding bank capacitances 413. With proper selection of $C_{COL}$ 412, $C_{BANK}$ 413 and $C_{CELL}$ 415, the charge sharing amplitude reduction can be balanced against the source drive voltage range to achieve a reasonable transfer fraction from source voltage pins P[23:0] to the pixel control node $V_{pixel}$. The sixth operation 513 of the frame load operation 506 is a bank and row precharge operation similar to 510 except that it is precharging a different row in this example (R[1]). Subsequent bank load operations 504 are used to successively load all the rows of the TFT pixel matrix, ending on the final row transfer operation 515.

The last timing group shown in FIG. 5 is comprised of a sequence of frame load operations 506 followed by a negative stress control operation 516, an optional column select gate monitoring operation 518 and an optional bank select gate monitoring operation 519. The frame load operations are repeated every frame refresh period 517.

The positive stress on the column select gates C[29:0] 301 401 is much higher than the positive stress on the bank select lines B[9:0] 302 402 due to the higher positive duty cycle of the column select gates 301 401 during the column loading operation 520. As a result, during the negative stress control operation 516 the column gates 301 401 need to be held at a negative voltage for longer stretches of time compared to other gates to allow the negative stress to compensate for the accumulated operational positive stress. The negative stress control operation 516 relies on the fact that the negative stress response is nonlinear with respect to the duration of the negative stress. By applying a non-operational (i.e. not display refreshing) time modulated signal between frame load operations, the negative stress can be intentionally and proactively applied in measured amounts to counterbalance the accumulation of positive stress during the operational frame load operation.

Similarly the positive stress on the bank select lines B [9:0] 302 402 is much higher than the positive stress on the row select lines R[7:0] 303 404 due to the relatively higher positive duty cycle of the bank select signals. During negative stress control operation 516 the bank select gates 302 402 are held a negative voltage for shorter intervals than the column select gates 301 401 but longer intervals than the row select gates 303 404.

Lastly, the row select and row enable gates (R[7:0] 303 404 and $R_{EN}$) see the lowest positive duty cycle of all the TFTs. By lowering the frame rate to save power, the negative stress accumulated on the row select transistors 410 411 during the time in between frame load operations could be larger than the positive stress accumulated during the frame load. To balance the negative stress with the positive stress, non-functional (i.e. not scanning or loading) positive pulses are preferentially added to the row select and row enable gate signals to break up the negative stress period to reduce the negative threshold shift.

By tailoring the pulse durations, negative stress periods and gate positive and negative voltages appropriately, the positive and negative stress can be balanced across all the gate drive types (column selects, bank selects, row enable and row selects) required to support the column and row drive system described by the present teachings.

While described using a specific embodiment of a 240×80 RGB display, the present teachings can be generally applied to any demultiplexer based display system that has TFT or switching devices with asymmetric positive and negative stress accumulation mechanisms and at least one stress mechanism that is nonlinear in time. By breaking the frame period into two sections, namely a frame loading operation and a stress control operation, the accumulated stress can be balanced for all of the different types of demultiplexing gate signals used to operate the display.

In addition or in the alternative, the frame period 517 of the display drive waveforms can be modified to support more or less negative stress accumulation, allowing additional tuning of the positive/negative stress balance.

The stress control waveforms in 516 can be predetermined to compensate for known drive waveforms and a known TFT stress nonlinearity. Without relying on feedback, such a system is known in the art as a feed-forward compensation system.

In an additional or alternative embodiment, the display controller IC 201 can insert one or more additional stress monitoring steps (e.g. 518 and 519) into one or more frame periods 517 as shown in FIG. 5. In one embodiment of stress monitoring 518, an AC signal is applied to the P[23:0] 300 400 pixel source signals. The column select gate lines C[29:0] 301 401 are held at a positive voltage while the other select gates in the system are held in the negative off state. The AC impedance through to the $V_B$ 406 signal through the $V_{COL}$ capacitance 307 412 can be measured by the display controller IC 201 using a decay time or multipoint frequency response method as is well known in the art. Since the $V_{COL}$ capacitance 307 412 is relatively stable over the lifetime of the display, the on resistance of the column select TFT transistors 408 can be computed from the measured AC impedance directly. Threshold voltage shifts in the column select TFTs 408 can be directly monitored with this method and the negative stress reduction pulses applied using a negative feedback control loop, for instance, to regulate the TFT threshold voltage directly. Similarly, the bank select transistors can be monitored as well by activating both the column select gates C[29:0] 301 401 and the bank select gates B[9:0] 302 402 simultaneously while measuring the AC impedance from P[23:0] to $V_B$. The differential impedance measurement from P[23:0] to $V_B$ when only column select lines C[29:0] 301 401 are active compared to when both column C[29:0] 301 401 and bank B[9:0] 302 402 select lines are active can be used to measure the on resistance of the bank select TFTs 409. Based on this measurement, a control loop can then modify the negative bias pulse width applied during negative stress control period 516 to adaptively correct the accumulated operational stress. In addition or in the alternative, one or more non-operational stress monitoring devices may be fabricated on the flat panel, preferably one or more for each type of gate drive waveform, that can then be monitored directly for threshold voltage shifts (using, e.g., AC impedance, a constant drain-source current or other threshold or impedance monitoring techniques known in the art).

In addition or in the alternative, for alternative switching devices other than a-Si:H TFTs, negative stress may dominate during the operational period requiring a positive stress control period. The concepts described herein are not particularly limited to the polarity of the operational stress and the corresponding anti-polarity of the controlled compensating stress.

In addition or in the alternative, the stress modulation technique can encompass a wide variety of techniques, including but not limited to amplitude modulation, frequency modulation, pulse width modulation, or combinations thereof. In addition or in the alternative, the stress control period 516, one or more optional stress monitoring periods 518 519, and the frame update period 506 can be temporally interleaved to effect a modulation of the compensating stress or as desired by the system designer to the extent allowed by the nonlinear stress accumulation characteristics of the TFT devices.

Many choices on the specifics of the stress monitoring and stress modulation methods are available to designers skilled in the art; the concepts described herein are not limited by such design decisions. Modifying the device drive waveforms during a stress control period 516 to balance the accumulated operational stress by forming a closed loop system is important and is not limited by the specifics of the stress polarity, stress monitoring structure or method, nor the stress modulation method.

Persons skilled in the art will recognize that a wide variety of display resolutions, specific scanning waveforms, demultiplexing circuits, stress monitoring device configurations (either dummy or operational), stress monitoring processes can be chosen to implement the present teachings.

Figure 6:
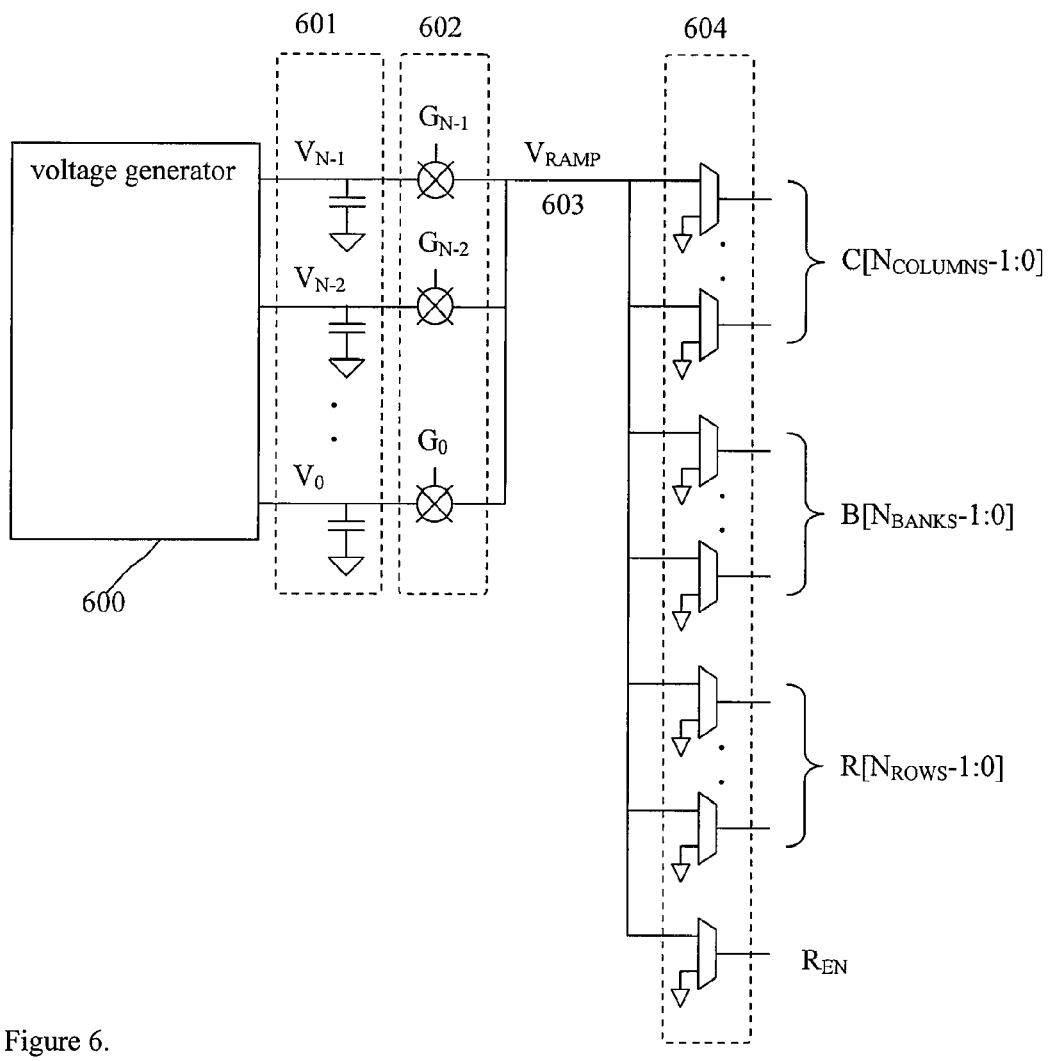
FIG. 6 shows a representative pulse generation system.

FIG. 6 shows a stepwise charge recycling or adiabatic gate pulse generator that can be implemented in the driver IC 201. Stepwise charge recycling adiabatic pulse generators are well known in the art but have found limited applications due to the complexity of the control logic and output slew rate limitations. A system using the present teachings, however, can utilize this type of efficient pulse generation due to the low complexity and self-similarity of the output gate drive waveforms and the relaxed speed requirements. The gate waveform generator of FIG. 6 is comprised of a DC voltage generator that produces two or more voltage outputs $V_0$ to $V_{N-1}$ where N>=2 that are stored on capacitors 601. A series of switches 602 controlled by switch control signals $G_0$ to $G_{N-1}$ connect the voltages $V_i$ sequentially to a gate waveform node $V_{RAMP}$ 603. The gate waveform node 603 can be connected to each of the required gate waveforms of the systems described herein through a bank of muxes 604.

Figure 7:
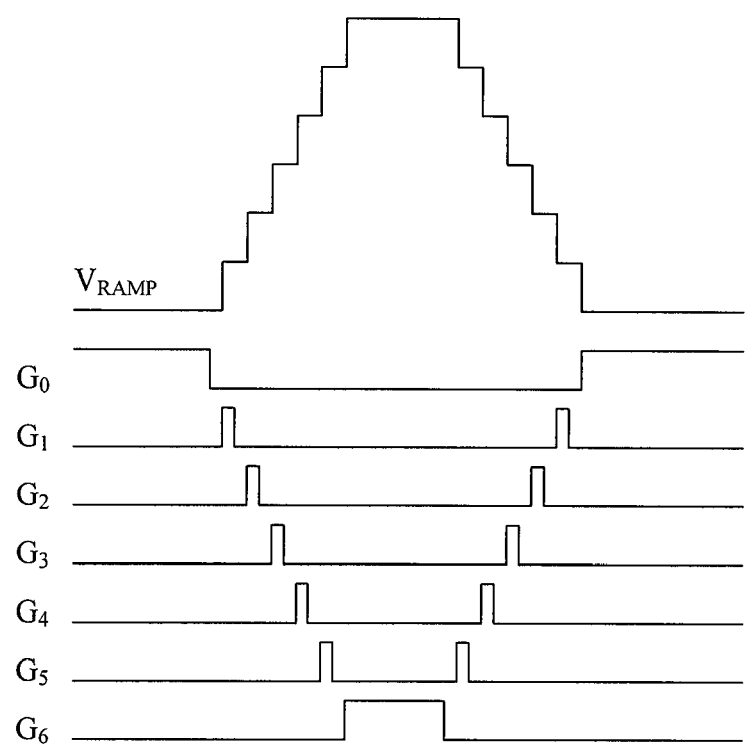
FIG. 7 shows a representative set of waveforms associated with the pulse generation system of FIG. 6.

FIG. 7 shows a series of drive waveforms for each of the switch control signals $G_0$ to $G_{N-1}$ and the output gate waveform $V_{RAMP}$. At rest, $G_0$ is active and the $V_{RAMP}$ node 603 rests at its lowest voltage. When a gate control voltage is required on one or more flat panel pins, the appropriate muxes are connected to $V_{RAMP}$ using muxes 604. The switch control signals are then sequentially activated ($G_1$ to $G_{N-1}$) to successively connect with break-before-make transitions each of the stored voltages $V_1$ to $V_{N-1}$ to the $V_{RAMP}$ and selected gate control pins (e.g. C[29:0], B[9:0], R[7:0] and/or $R_{EN}$). By charging the output sequentially up using lower voltages than the final voltage $V_{N-1}$, the system efficiency as seen from the input of the DC voltage generator 600 can be improved over conventional circuits. To return the gate control node back to its lowest potential, the switch controls $G_{N-1}$ to $G_0$ are successively pulsed so that the node $V_{RAMP}$ 603 is successively connected to each of the storage capacitors 601 recycling much of the charge. By connecting the $V_{RAMP}$ node 603 and the connected output gate signals (e.g. C[29:0], B[9:0], R[7:0] and/or $R_{EN}$) to each of the stored voltages $V_{N-1}$ to $V_0$, the charge contained in the parasitic capacitance seen by $V_{RAMP}$ can be recycled onto the storage capacitors 601, improving efficiency. Those skilled in the art will recognize that there are many circuit topologies that can be substituted for the particular adiabatic pulse generator described here; the concepts described herein are not particularly limited to the type or topology of pulse generator. The key element of the present teachings is that an adiabatic or efficient pulse generator with a muxing structure 604 can be effectively combined with a display architecture as described herein due to the self-similarity and non-overlapped nature of the pulsed gate control waveforms (e.g. C[29:0], B[9:0], R[7:0] and $R_{EN}$).

Figure 8:
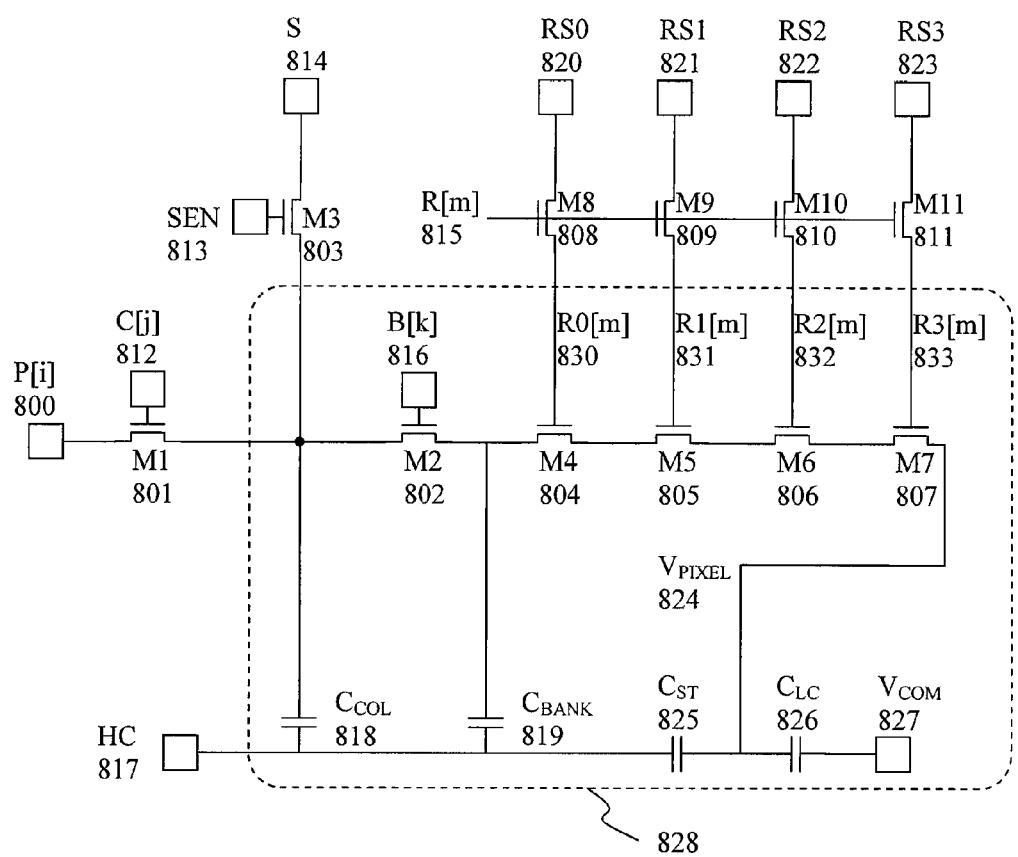
FIG. 8 shows a representative equivalent circuit of a single pixel.
Figure 9:
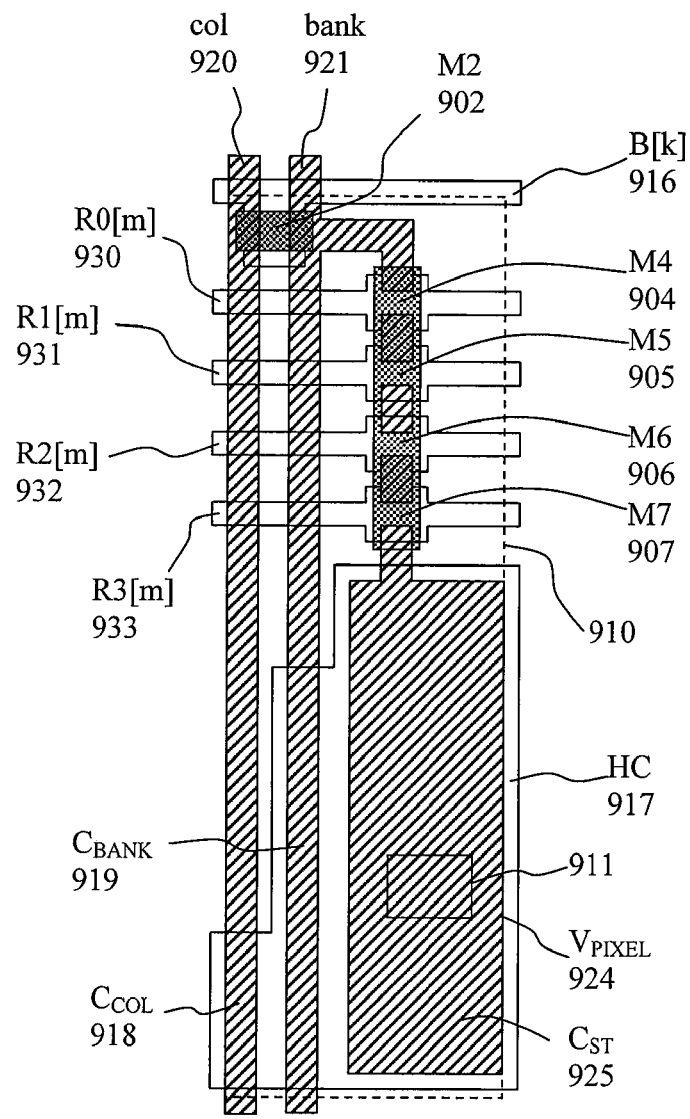
FIG. 9 shows a representative circuit layout of a single pixel.
Figure 10:
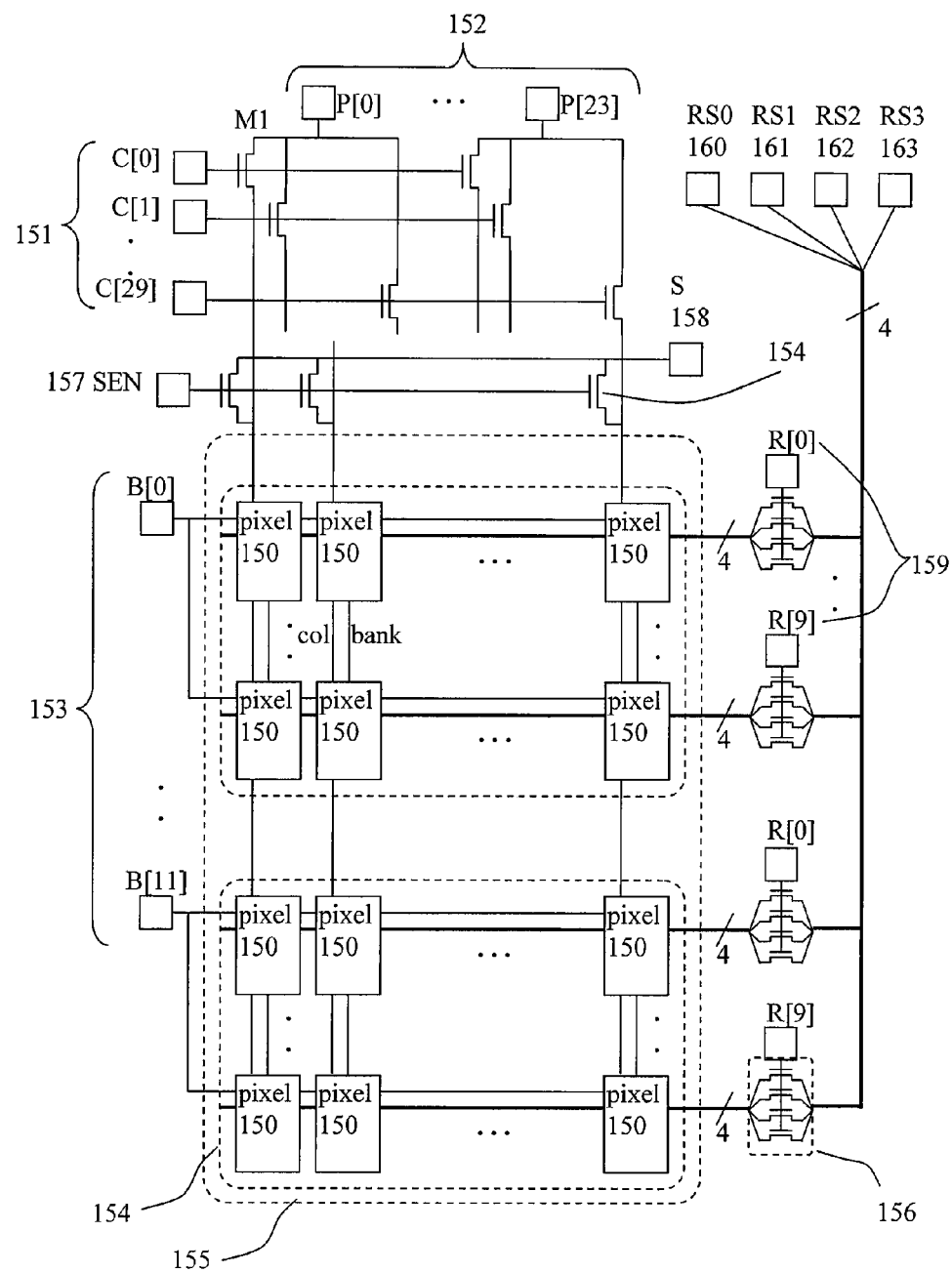
FIG. 10 shows a representative flat panel equivalent circuit.

FIGS. 8 through 10 show an alternative embodiment of the present teachings. FIG. 8 shows a pixel equivalent circuit 828 that corresponds to the a-Si:H TFT circuit layout in FIG. 9. FIG. 9 shows an example pixel layout of the present teachings in a standard two metal a-Si TFT LCD technology that can be tiled horizontally and vertically to form a large array of pixels. Those skilled in the art will recognize that the concepts described herein may be applied to other TFT processes with different design rules and layers; the choice of process exhibited in FIG. 9 is for illustration purposes and is not a limitation of the present teachings. Also, the layout of FIG. 9 has many permutations, transpositions, reorientations, flips, rotations and combinations thereof that do not substantially modify the electrical behavior of the circuit and are considered within the scope of the present teachings. Based on the present teachings, advantageous layout configurations of the equivalent circuit 828 that minimize crosstalk, improve image quality, adjust storage capacitance, reduce power, improve stability, improve manufacturability and modify performance of the device based on the particular TFT process and application requirements will become evident to those skilled in the art and are considered within the scope of the concepts described herein.

The pixel circuit 828 in FIGS. 8 and 9 comprises five TFT devices, namely a partial bank select transistor M2 802 902 and a series of row gate TFTs: M4 804 904, M5 805 905, M6 806 906 and M7 807 907. The bank select transistor M2 802 902 in this example is replicated in many pixel cells; each pixel cell contains a portion of the total bank selector transistor. Such parallel devices are often employed in the art to make layout more regular; such modifications are well within the scope of the present teachings. These bank select TFTs are activated sequentially to transfer a desired pixel voltage value from a vertically running column line, col 920, through another vertically running bank storage line, bank 921, to the pixel storage capacitor $C_{ST}$ 825 925. The transfer from $C_{COL}$ 818 918 to $C_{BANK}$ 819 919 is made by pulsing the gate of M2 802 902 by driving line B[k] 816 916. A common hold capacitor ground, HC 817 917, is attached to the three storage capacitors in each example pixel, namely $C_{COL}$ 818 918, $C_{BANK}$ 819 919 and $C_{ST}$ 825 925. The pixel storage capacitor, $C_{ST}$ 825 925, is preferably attached via a contact 911 to a reflective electrode 910 103 that is the bottom plate of the liquid crystal capacitance, $C_{LC}$ 826. The opposing electrode 111 forms the other plate of $C_{LC}$ 826 and is attached to a common pixel voltage $V_{COM}$ 827. The RMS difference in voltage between $V_{PIXEL}$ 824 924 and $V_{COM}$ 827 determines the optical state of the liquid crystal 104. In one embodiment, the $V_{COM}$ 827 node is modulated continuously to reduce the required voltage range of the TFT devices and/or reduce power.

The four row transfer TFTs, M4 804 904, M5 805 905, M6 806 906 and M7 807 907 are gated by four independent row gate signals R0[m] 830 930, R1[m] 831 931 R2[m] 832 932 and R3[m] 833 933 respectively. The choice of four gates is for illustration purposes only; in practice the number of row transfer TFTs will be a design choice based on the TFT process parameters, the size and resolution of the display, the desired frame rate, the allowable flicker and other performance criteria. In the present embodiment, two or more row transfer TFTs are required to prevent negative stress accumulation at very low frame rates as described below. Such choices are considered within the scope of the present teachings.

FIG. 10 shows an example array of pixel circuits 828 150 arranged to form a 720×120 pixel array 155 (240 RGB×120 pixels) comprising twelve banks 154 of pixels corresponding to the equivalent single pixel circuit of FIG. 8 and the pixel layout of FIG. 9.

FIG. 8 and FIG. 10 show the equivalent circuit of the peripheral circuitry that is required to achieve a programmable voltage $V_{PIXEL}$ 824 924 on a given example pixel 828. Pixel source voltage P[i] 800 152 is connected to TFT M1 801 which is gated by one of the column select gate lines C[j] 812 151. A precharge voltage source S 814 158 is preferentially used to set all $C_{COL}$ voltages using an array of TFTs M3 803 154, one for each column line, that are gated by a common precharge enable signal SEN 813 157. Row signals R0[m] 830, R1[m] 831, R2[m] 832 and R3[m] 833 are driven by a set of pass transistors M8 808, M9 809, M10 810 and M11 811 respectively (shown in FIG. 10 as a group 156) from a set of four row source signals RS0 820 160, RS1 821 161, RS2 822 162 and RS3 823 163 and a common gate signal that is specific for a given row m of pixels, R[m] 815 159. The peripheral TFTs M1 801, M3 803, M8 808, M9 809, M10 810 and M11 811 are preferably placed around the perimeter of the display; however in some circumstances it may be advantageous to place part or all of these transistors within the pixel array. Similarly it may be advantageous from a circuit topology perspective to use parallel or sequential devices that achieve the same function as the circuit of FIG. 8 using a different but electrically similar circuit. Such design and layout choices are common implementation permutations known in the art; the concepts described herein are not particularly limited by a specific choice of layout or trivial parallel/sequential reorganizations of the TFT devices described herein.

The operation of this embodiment of a flat panel can be described as consisting of two phases. In practice the two phases can be interleaved, but for clarity they are described herein as distinct phases. The first phase involves writing a new frame of information to the pixel array. To accomplish this, a sequence of operations is performed on the array. The pseudocode for the frame update is as follows:

```
for (m=0;m<NumRow;m=i+1)
    begin
        ClearRow(m);
        for (k=0;k<NumBank;k=k+1)
            begin
                for (j=0; j<NumCol; j=j+1)
                    begin
                        WriteCol(m,j);
                    end
                WriteBank(m,k);
            end
        WriteRow(m);
    end
``` where NumRow is the number of rows (in this example 10), NumCol is the number of column gates (in this example 30) and NumBank is the number of banks (in this example 12). The ClearRow(m), WriteCol(m,j), WriteBank(m,k) and WriteRow(m) commands preferentially have two polarity states that can be alternated based on row number (m) or frame to achieve a balanced DC voltage across the LCD pixels. In addition or in the alternative, the present embodiment can implement any one of a number of known pixel, frame, row, dot or other inversion pattern as in known in the art to achieve DC balance across the LCD material.

The ClearRow(m) operation activates M3 803 154 by pulsing gate SEN 813 157 high so that the voltage on pin S 814 158 is connected to CCOL 818 918. Gate lines B[k] 816 916 153 for all banks are also pulsed high so that all CBANK 819 capacitors are also charged to the voltage on pin S 814 158. Finally for a given row m, its row select line R[m] 815 is pulsed high along with the four RS lines 820 821 822 823 160 161 162 163 to transfer the S pin 814 158 voltage to one row of pixels via the row transfer TFTs M4 804 904, M5 805 905, M6 806 906 and M7 807 907 in each pixel. This operation acts to preset a target row m and all the bank capacitors to a voltage that is preferentially similar to its subsequently programmed voltage, in the process erasing the previous voltage on the pixel capacitor, $V_{PIXEL}$ 824 924. Without such erasing, the charge sharing transfer method could lead to image ghosting and artifacts. Those skilled in the art will recognize that with the proper choice of transfer capacitors and/or in applications that are relatively insensitive to image artifacts the ClearRow (m) operation may be eliminated to reduce power and/or complexity.

Once a row has been cleared, the next operation is to fill all the banks with that row's pixel values. A sequence of Write-Col(m,j) calls, each one of which parallel loads 24 analog pixel values onto the $C_{COL}$ capacitors 818 918, builds a 720 element array of voltages on the $C_{COL}$ capacitors 818 918 that is then transferred to a given bank k by pulsing the gate control line B[k] 816 916 153. Once all the bank capacitors $C_{BANK}$ 819 919 have been loaded (a total of 8,640 capacitors in this example), the target row m can be again driven by the action of the row select signal R[m] 159 815 and the row source RS0-3 (160, 161, 163, 163) as before to share the charge stored on the $C_{BANK}$ capacitors 819 919 with the pixel charge on the pixel storage capacitors $C_{ST}$ 825 925. Each row can be similarly loaded to complete the frame as described in the pseudocode above. Those skilled in the art will recognize that the exact sequence of the actions taken, e.g. that the rows are processed sequentially, can be modified to achieve a similar end. Some advantageous changes, e.g. writing all even rows first, then all odd rows, can be adapted to the present system to reduce voltage swings and power dissipation by minimizing transitions while performing row inversion DC balancing. Such modifications and permutations are considered within the scope of the present teachings.

Once the entire array of pixel values is written, the array can be placed in a standby state to conserve power until the pixel voltages leak away and require refreshing to prevent image artifacts (e.g. flicker). This standby state between frame updates comprises the second phase of the operation of the present embodiment. Many applications of flat panels can make use of a variable frame rate; the concepts described herein are well suited to applications where the frame rate must run fast for certain types of content (e.g. 30 Hz frame rate when the user is actively interacting with the device) but also needs a low power state where frame refresh rate can drop to a few Hz. To achieve this, a variable length standby state can be inserted between the active frame refreshes of the first phase described above.

In one embodiment, gate lines C[j] 812 151, SEN 813 157, B[k] 816 153 and R[m] 815 159 are preferentially biased so that their associated TFTs achieve a $V_{GS}$ very close to zero. Such low stress conditions act to remove the effects of the operational (phase 1) stress on the TFT devices. If additional negative stress is required to compensate for a positive threshold shift, the $V_{GS}$ can be made appropriately negative to generate a controlled amount of negative stress. As described above, stress monitoring devices or AC impedance measurements, among other techniques, can be used to measure the threshold shift of the various TFT devices. One key aspect of the concepts described herein is to compensate for the accumulated positive stress by temporal or amplitude waveform modulation in a destress phase between frame refreshes.

The RS lines 820 821 822 823 and the internal nodes that are set by them R0[m] 830, R1 [m] 831, R2[m] 832, R3[m] 833 are also cycled during the destress phase to maintain the pixel array's charges. Since a strongly negative $V_{GS}$ is typically needed to block the leakage path of the pixel storage capacitor $C_{ST}$ 825 925 at least one of the four row transfer TFTs 804 805 806 807 must be strongly off at any one time. Strongly negative $V_{GS}$ values tend to accumulate negative stress; negative stress is known to have a strong dependence on the negative pulse width, becoming much larger as the negative pulse width gets longer. In one embodiment of the present teachings, the Rx[m] lines 830 831 832 833 are sequentially brought low one at a time to prevent the accumulation of negative stress while preserving the charge storage of the pixel voltage. By pulsing all of the R[m] signals 815 159 periodically to transfer cyclic RS 820 821 822 823 values to the row transfer gates, three of four row transfer TFTs 804 805 806 807 will at any one time have a $V_{GS}$ preferentially very close to zero while the remaining TFT will have its gate at a sufficiently negative $V_{GS}$ to prevent the leakage of the stored pixel voltage during the standby period. By rotating the charge blocking assignment between at least two row transfer TFTs 804 805 806 807 within each pixel, the deleterious negative stress effects of long negative pulse widths can be effectively avoided. As long as the pixel voltage is preserved by the row transfer FETs M4, M5, M6 and M7, the demultiplexing TFTs (e.g. M1 802, M2 802, M3 803) can be put in a very low power, very low stress standby state (e.g. $V_{GS}=0$) and/or negative stress compensation can be applied.

As described above, the accumulation of negative stress can be avoided in many cases by keeping $V_{GS}$ close to zero in the standby phase; in addition or in the alternative, the standby state $V_{GS}$ can be uniquely controlled per input gate to compensate for operational threshold shift. Amplitude and timing modulation can effectively tailor the accumulated negative stress to compensate for positive stress. In a preferred embodiment, the waveforms and levels used in the standby destress state are chosen to minimize transitions and power dissipation.

Figure 11:
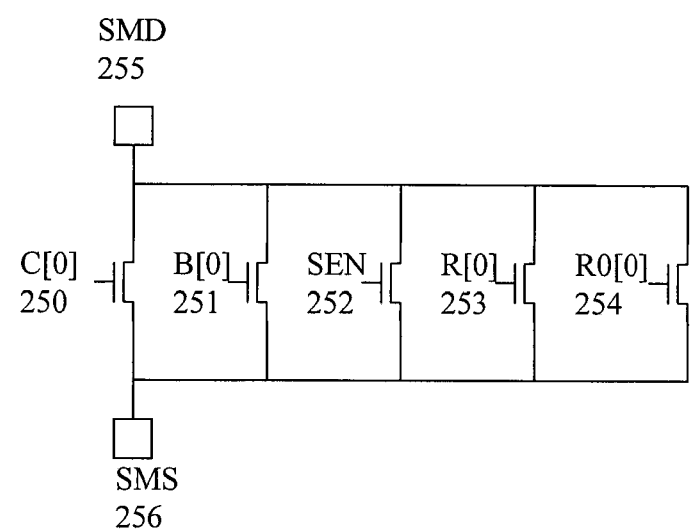
FIG. 11 shows a representative stress monitoring circuit.

FIG. 11 shows a set of stress monitoring devices that share a common source SMS 256 and drain SMD 255. The five TFTs are attached to one of each of the gate signal types of the TFT circuit, namely C[0] 250, B[0] 251, SEN 252, R[0] 253 and R0[0] 254. By testing the conduction or drain current from SMD 255 to SMS 256, the threshold and stress condition (including subthreshold slope) can be determined. In addition or in the alternative to the AC impedance method described above, dedicated stress monitoring devices can be added to the display depending on the exact monitoring and compensation requirements. The particular arrangement of compensation devices and shared pins, if any, are a design choice; the particular example in FIG. 1 is for illustration only and is not intended to limit the scope of the present teachings.

Gate bias of N-type a-Si:H TFT devices is typically required to both activate and deactivate the devices. Positive gate bias in such devices turns the device "on" and typically induces a positive shift in the threshold voltage of the device over long time scales. Negative gate bias turns the device "off" and typically induces both a negative threshold shift and subthreshold slope reduction over long time scales.

Stress accumulation for bipolar gate drive in a-Si:H TFTs is generally thought to follow a stretched exponential of the form:

$$\Delta V_T(t_{ST}) = \Delta V_T^+(t_{ST}) + \Delta V_T^-(t_{ST})$$

Where $$\Delta V_T^+(t_{ST}) = A_+ V_{G+}^{\alpha+}(t_{ST}*D)^{\beta+}$$

and $$\Delta V_T^-(t_{ST}) = A_- V_{G-}^{\alpha-}(t_{ST}*(1-D))^{\beta-} F_{PW}$$

where $\Delta V_T$ is the threshold shift, $V_G$ is the gate bias less the threshold voltage of the device, $t_{ST}$ is the total stress time, A is an empirical constant, D is the duty cycle of the positive part of the drive signal and $F_{PW}$ is a factor between zero and one related to negative stress frequency. Generally the stress induced threshold shift is roughly proportional to the square of the gate drive amplitude ($V_{GS}-V_T$) and approximately the square root of the total stress time accounting for duty cycle (e.g. $\alpha+/-\sim=2$ and $\beta+/-\sim=0.5$). Due to the approximately square law dependence on voltage, a short duration high amplitude gate drive signal can generate significantly more stress than a lower gate voltage applied over a longer period of time; in a preferred embodiment, the gate drive amplitudes are minimized and charging time and TFT size are maximized to lower the required $V_{GS}$ gate drive and minimize TFT stress. The present teachings also make use of the asymmetric response to positive and negative stress by optionally modulating the negative stress as required to balance the accumulated positive stress.

Figure 12:
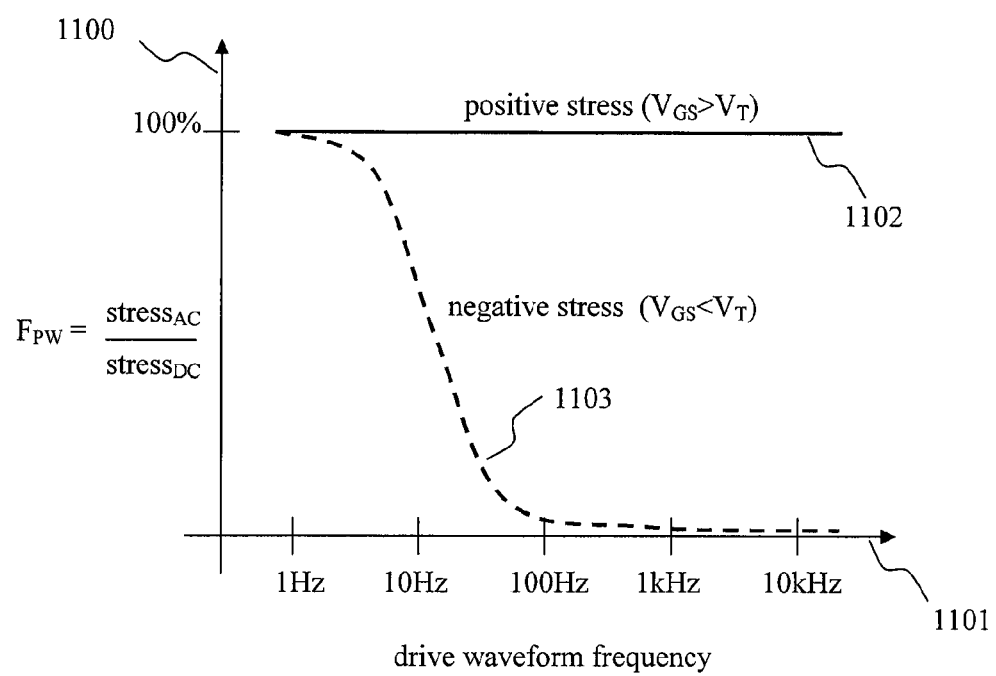
FIG. 12 shows a representative variation in the frequency response of positive and negative gate bias stresses on a-Si:H TFTs.

FIG. 12 shows a representative relationship between the drive waveform frequency 1101 and the accumulation of positive and negative stress relative to the accumulation of DC stress 1100 (=$F_{PW}$ for negative stress) typical of a-Si:H TFTs. Typically the positive stress 1102 is independent of gate signal frequency whereas the negative stress 1103 is highly dependent on frequency. In a conventionally scanned TFT flat panel in which each row is activated very briefly (e.g. 15 us every 16.6 ms frame; or about 0.1% duty cycle), the positive stress is more or less balanced by the negative stress accumulated between positive pulses. Because the frame rate is relatively high (e.g. 60 Hz) compared to the characteristic cutoff frequency in negative stress 103, the negative stress is substantially reduced relative to its DC value; this reduction is in fact necessary since the negative stress is 99.9% duty cycle in a conventional driving scheme.

In order to reduce the power of the flat panel display for static information displays it would be useful to reduce the frame rate of the flat panel as power is more or less proportional to the frame frequency. However with lower frame frequency the consequent lower negative stress frequency increases the effect of the negative stress per FIG. 1 to the point where the lifetime of the flat panel is substantially shortened. The present teachings describe a circuit technique that mitigates such negative stress at very low frame rates (e.g. 4 Hz) to achieve a very low standby power display.

One of the key objectives of integrated row and column driver circuits is to reduce the pin count required to drive the display substrate. Integrated drivers typically must have some signals that are modulated substantially faster and/or more often than the frame rate to achieve such pin count reduction. Due to the limited operating frequency of a-Si:H TFTs, such higher modulations require higher duty cycle of at least some of the devices used in the integrated driver circuits. Also, due to the need for high voltages to switch TFT devices in the pixel array, such driver circuits must be designed to handle typically higher voltages than the pixel array. With higher duty cycle and higher voltages comes higher positive stress and higher threshold shifts; such effects are the primary limitation on the operating lifetime of integrated driver a-Si:H TFT displays. The present teachings describe a method by which the duty cycle and positive voltage bias can be reduced in integrated drivers while maintaining the capability to drive high amplitude positive and negative voltages into the pixel array.

Figure 13:
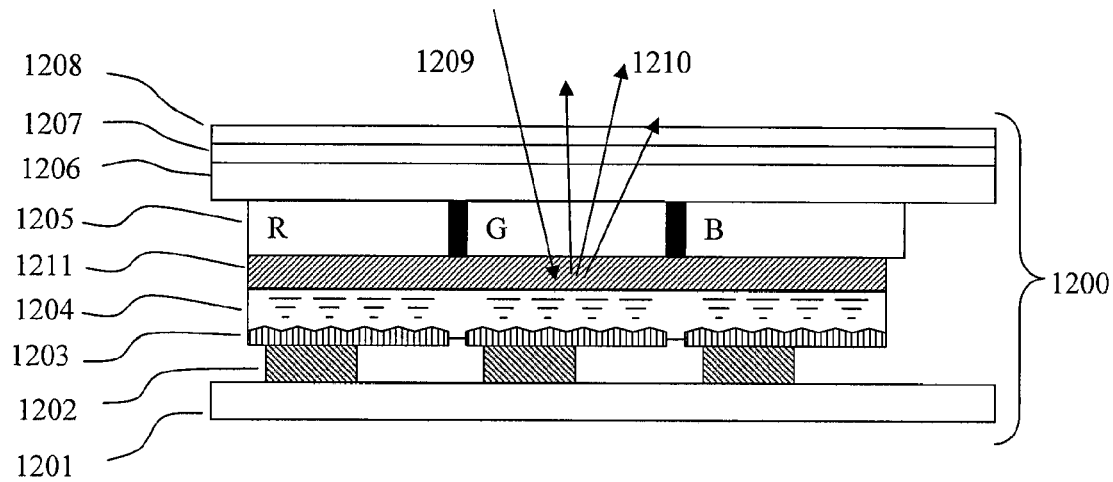
FIG. 13 shows a representative reflective TFT LCD configuration.

FIG. 13 shows a simplified cross section of a reflective single polarizer TFT LCD flat panel display 1200. The control circuitry 1202 is fabricated on a substrate 1201. Control circuitry 1202 may be implemented preferably in an a-Si TFT process but can alternatively be implemented using LTPS processing or any thin-film switch-capable backplane technology. Substrate 1201 can be glass, plastic, quartz, metal, or any other substrate capable of supporting switching device fabrication. Electrode 1203 can be formed by lithographic, deposition and/or chemical processes and can be textured to diffusely reflect incident light. Liquid crystal display material 204 sits in between the top and bottom plates 1203 and 1211. Color filters 205 and a transparent conductor 1211 are deposited on the top substrate 1206. A retardation film or quarter wave plate 1207 can be placed on top of the upper substrate 1206. A diffusing polarizer 1208 completes the LCD stack 1200. In typical operation incident light 1209 is polarized, filtered and diffusely reflected by the LCD stack 1200 to create a reflected image 1210.

Alternative active display configurations other than that shown in FIG. 13, such as dual polarizer reflective, transmissive, transflective, backlit, sidelit, guest host, ECB, OCB, STN, HTN, TN, MTN, RTN, PDLC, electrophoretic, electronic ink and other alternate liquid crystal and/or other display technologies that require an active backplane can benefit from the present teachings. The specific description herein of a reflective LCD incorporating the present teachings does not limit the scope of the present teachings in their application to alternative display materials and technologies.

Figure 14:
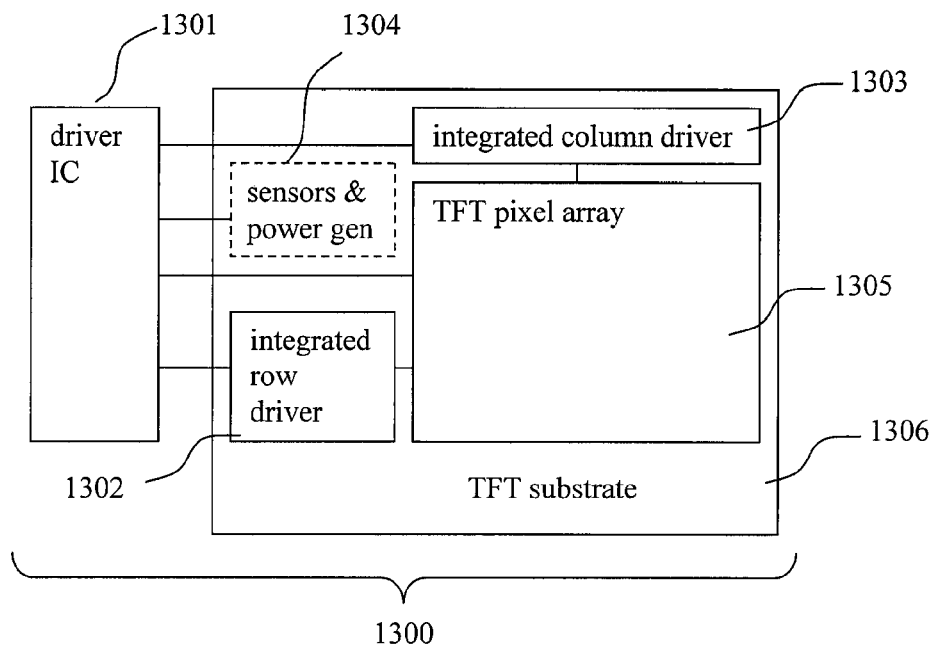
FIG. 14 shows a representative block diagram of a TFT LCD electrical system.

FIG. 14 shows an example block diagram of the electrical drive system of the flat panel display 1300. TFT substrate 1306 incorporates a TFT pixel array 1305, an integrated column driver 1303 and an integrated row driver 1302. An off-substrate driver IC 1301 provides control signals to the TFT pixel array 1305, the integrated row driver 1302 and the integrated column driver 1303. In an alternative embodiment the driver IC 1301 may be attached to the substrate 1306 using a wide variety of assembly techniques that are well known in the art such as chip-on-glass (COG) bonding using anisotropic conductive film (ACF). In an additional embodiment, the driver IC is packaged using chip on film (COF) technology; such film is subsequently attached to substrate 1306 to provide electrical drive signals. Optional circuitry 1304 such as threshold monitoring sensors and/or power conversion circuits can also be integrated in TFT technology on the substrate 1306.

FIG. 14 shows an electrical diagram of the integrated column driver 1303, the integrated row driver 1302 and the TFT pixel array 1305 for an example display with 240×120 RGB stripe pixels that contains an array of 720×120 electrical pixel elements 1305. Those skilled in the art can apply the present teachings to many alternative pixel resolutions and control bus widths; the choice of 240×120 is for illustration only and does not limit the scope of the present teachings to specific resolutions or signal bus widths. Also in what follows the TFT devices are assumed to have a threshold voltage of zero for the sake of simplifying the description. Those skilled in the art will recognize that non-zero threshold voltages are easily accommodated by offsetting the gate and control voltages described herein. The present teachings are easily generalized for non-zero threshold voltages by those skilled in the art; such generalizations are considered within the scope of the present teachings.

Figure 15:
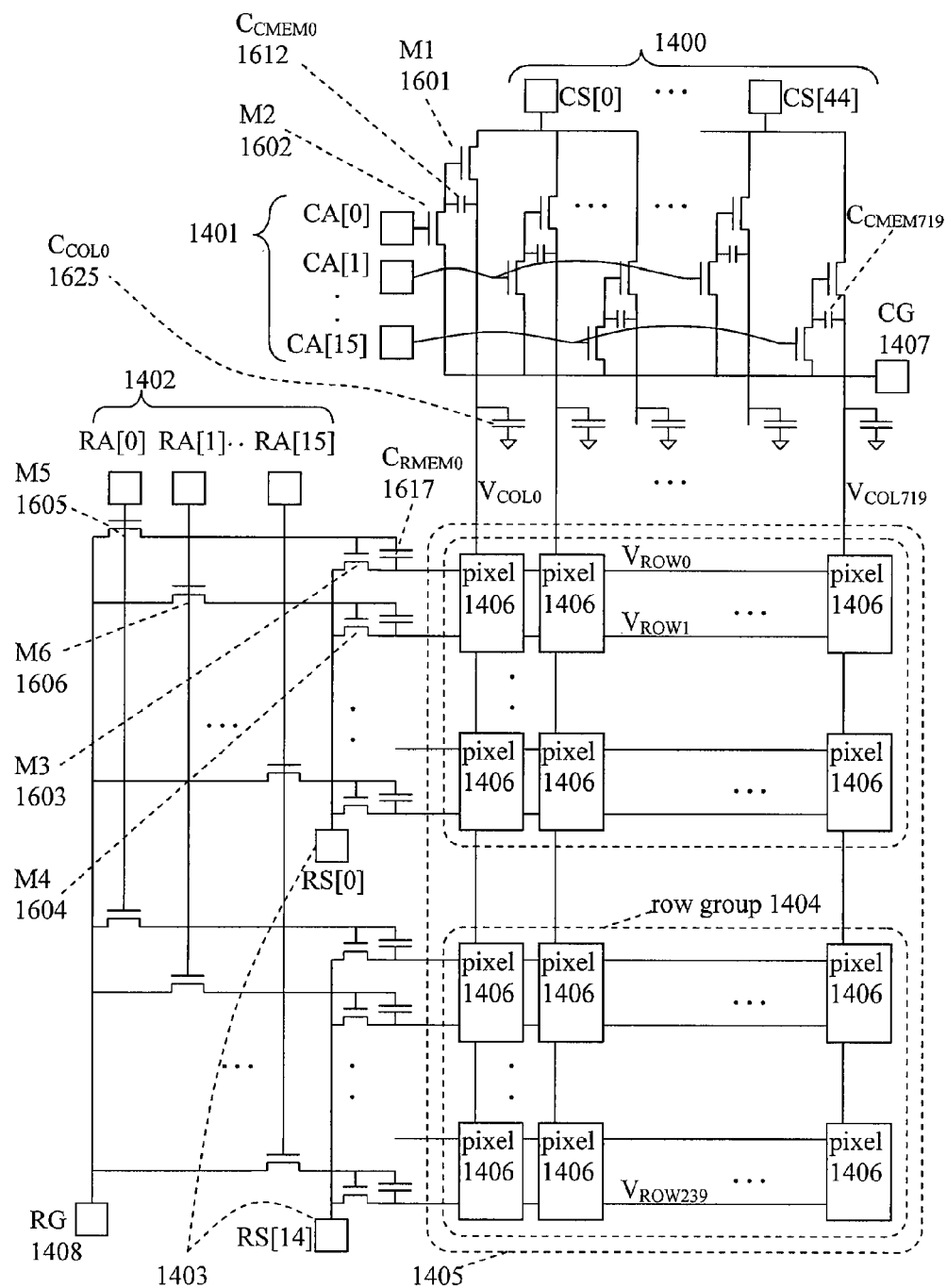
FIG. 15 shows a representative electrical schematic of a TFT substrate containing 720×120 pixels.

In FIG. 15, pins CS[44:0] 400 supply the analog LCD pixel voltages that are driven into the pixel array 1405. Column demultiplex TFTs, one of which is identified as M1 1601 in FIG. 14, are controlled by a single bit of dynamic memory stored on a gate capacitor, the corresponding one of which for M1 1601 is identified as $C_{CMEM0}$ 612 in FIG. 15. The gate bias stored on each of the column demultiplex control capacitors such as $C_{CMEM0}$ 1612 determines whether the column pass TFT (e.g. M1 601) is in a conductive "on" or nonconductive "off" state. The 720 column lines, several of which are identified with $V_{COLn}$ label in FIG. 15 (where n=0 to 719), have large parasitic capacitances in the pixel array 1405 that are used as a temporary storage for a row of pixel voltages, one of which is identified as $C_{COL0}$ 625 in FIG. 15. A row of pixel voltages are scanned onto such parasitic capacitances by the forty five CS[44:0] lines 400 using the forty five 16:1 demultiplex circuits shown in FIG. 15 composed of pass transistors such as M1 1601 that are sequentially pulsed to sample voltages from CS[44:0] 400 onto column capacitors such as $C_{COL0}$ 1625. Preferentially the sizes of M1 1601 and equivalent function column pass TFTs are chosen to be large enough to allow significant conduction to occur even with a relative low (e.g. a few volts) gate-source bias voltage.

Figure 16:
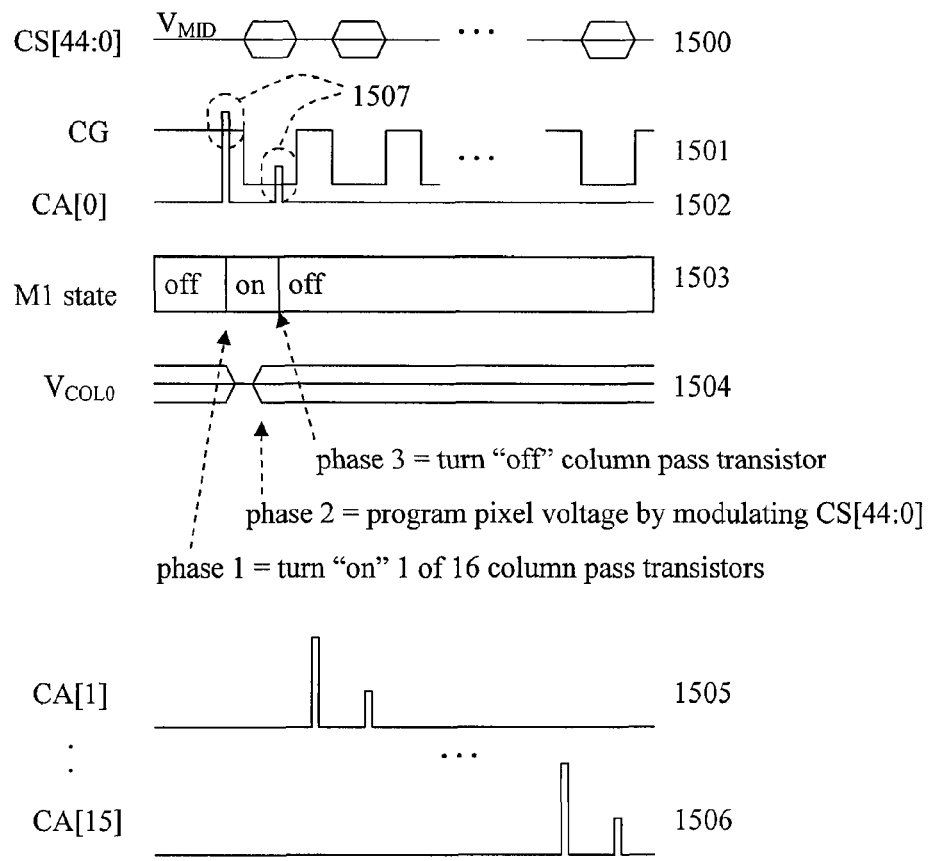
FIG. 16 shows a representative diagram of signal timing waveforms for a column scan operation.
Figure 17:
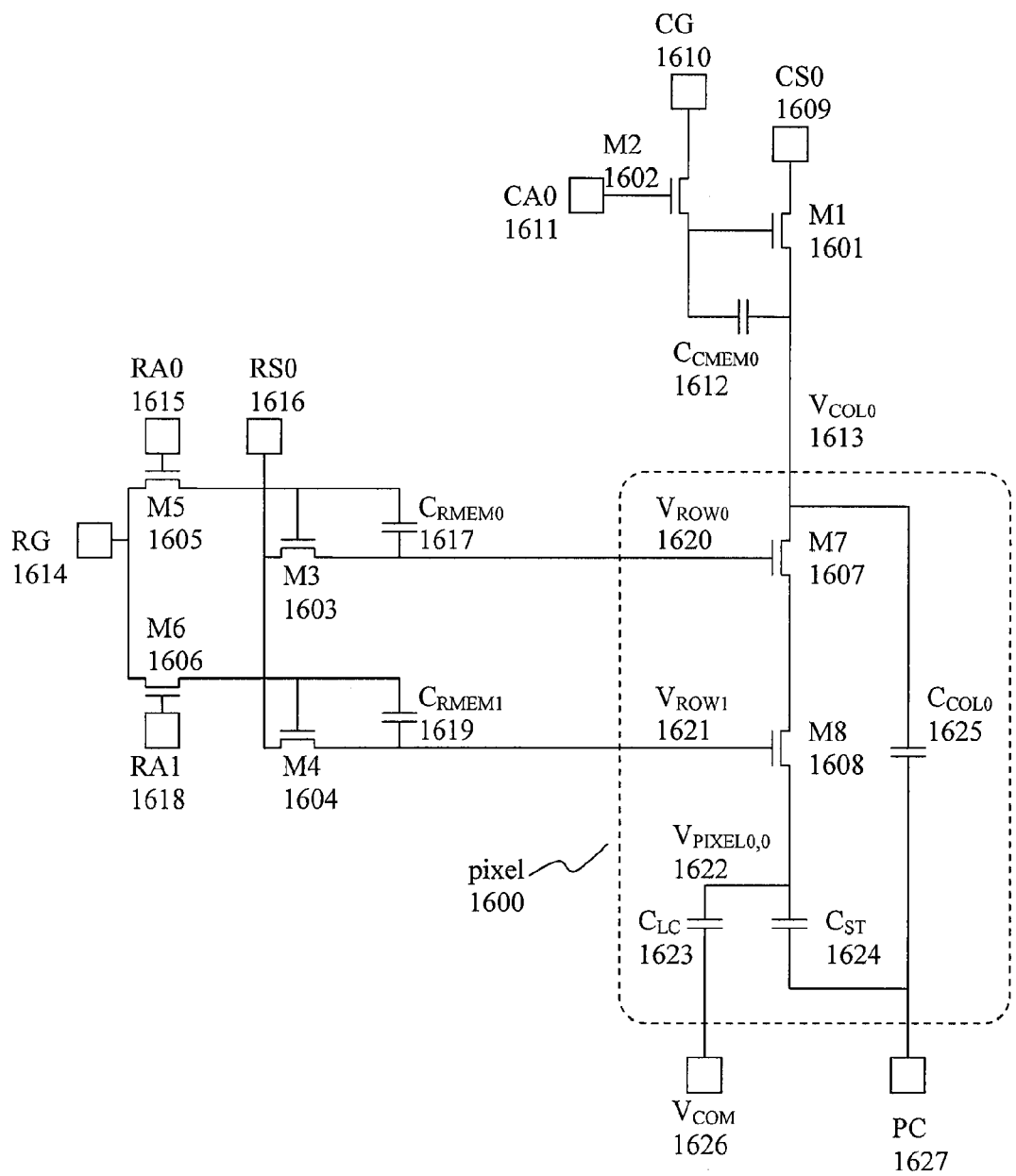
FIG. 17 shows a representative equivalent circuit for a single TFT pixel and the associated elements from the integrated row and column drivers.

Each column demultiplex operation requires three phases as shown in the timing diagram in FIG. 16 which includes the relevant waveforms required to drive a voltage onto the leftmost column capacitor $C_{COL0}$ 625 of the pixel array 1405. FIG. 17 also includes a relevant subset of the devices required for setting the column voltage $V_{COL0}$ 1613 and the row control devices required to write the stored column voltage $V_{COL0}$ 1613 into a pixel cell. The column scan operation described below indicates a preferred usage of the circuits and waveforms shown in FIGS. 15, 16 and 17.

At the beginning of the column demultiplex operation, all column demultiplex control capacitors such as $C_{CMEM0}$ 1612 are assumed to have a negative bias, i.e. all column pass TFTs such as M1 1601 are in the "off" state. In the first phase, the CS[44:0] lines 1400 1500 are preferentially brought to a mid level voltage, shown as $V_{MID}$ in FIG. 16, although a wide range of voltages is acceptable. The CG terminal 1407 1501 is brought to a voltage that is enough above the CS[44:0] 1400 1500 mid voltage level $V_{MID}$ to generate a gate bias that puts M1 1601 into an "on" state. Preferentially the "on" state of M1 1601 requires only a few volts of $V_{GS}$ voltage drive, i.e. M1 1601 is designed to be sufficiently large to have acceptable conduction with a few volts of $V_{GS}$ drive. The CA[15:0] lines 1401 are programmed so that only one of the sixteen wires has a positive $V_{GS}$ and can pass the control gate voltage, CG 1407, to the selected control capacitor such as $C_{CMEM0}$ 612. In FIG. 16, CA0 1502 is driven above the CG voltage 1501 during phase 1 to program the state of M1 1601 to "on" 1503. Because the source and gate voltages of all the activated TFTs are not data dependent during this operation, the gate voltages used to set the control capacitors such as $C_{CMEM0}$ 1612 can be kept very low compared to conventional demultiplex circuits which typically must pass high voltage data or control information. In this manner, the state of the control capacitors $C_{CMEMn}$ can be set using only low voltage control signals that minimize gate stress on both column control demultiplexing TFTs such as M2 1602 and column pass transistors such as M1 1601. At the end of the first phase, the voltage on the selected columns (e.g. $V_{COL0}$ 1613 1504) have settled to $V_{MID}$ and the CA[15:0] lines are brought back to a negative bias state that is capable of preserving the state of the column demultiplex control voltages stored on capacitors such as $C_{CMEM0}$ 1612 over the range of subsequent CS[44:0] 1400 1500 modulations.

In the second phase of the column demultiplex operation, the source voltage levels CS[44:0] 1400 1500 are driven to a desired analog pixel voltage value. The column pass transistors that are in the "on" state follow the CS[44:0] 1400 1500 variation for both positive and negative excursions from the mid level voltage, $V_{MID}$. One important consequence of using a control voltage stored on $C_{CMEM0}$ 1612 during the first phase is that the $V_{GS}$ of the pass transistor M1 1601 is nearly independent of the pixel source voltage that is driven from CS[44:0] 1400 1500 onto the column capacitors $C_{COLn}$ (e.g. $C_{COL0}$ 1625). This decouples the required pixel source voltage range (which might be 10V or more) from the control voltage (which might only be 2V to prevent stress accumulation) and consequently avoids the positive bias stress associated with high $V_{GS}$.

The third and final phase of the column demultiplex operation discharges the "on" TFT's control capacitor to an "off" state. CG 1407 1501 is brought to a low enough potential to guarantee that all column pass TFTs such as M1 1601 will be in the "off" state independent of the voltages stored on $C_{COLn}$ capacitors (e.g. $C_{COL0}$ 1625). Although the gate voltage of M1 1601 is data dependent at the time of discharge, discharging the $C_{CMEM0}$ 1612 capacitor to a negative voltage does not require a data dependent $V_{GS}$ across M2 1602. The previously selected column pass TFT (e.g. M1 1601) is turned to an "off" state by setting the corresponding CA[15:0] line 1401 (e.g. CA0 1502 in FIG. 16) to a voltage enough above the CG 1407 1402 level to turn on M2 1602, discharging $C_{CMEM0}$ 1612. At the end of the third and final phase of the column demultiplex operation, the CA[15:0] lines 1401 are returned to a negative "off" gate bias.

As described above, the present teachings confer a number of important advantages over the prior art demultiplex and/or scanning circuits. First, the control state of the demultiplexer can be set using only low voltage control signals that do not need to accommodate any data dependency, which both minimizes and regularizes positive stress, i.e. the stress seen by the transistors is more or less uniform, independent of the pixel data. Second, the pixel source voltage is allowed to have a wide excursion without introducing a large positive stress voltage on the demultiplex pass transistor also independent of pixel source voltage. Third, the control state of the demultiplexer can be reset without introducing large positive stress on the demultiplexing TFT. Fourth, the control signals for the demultiplexer are kept at a low voltage that can permit the use of lower voltage driver IC technology to set the demultiplexer state (i.e. the $C_{CMEMn}$ capacitor voltages).

As shown in FIG. 16, the control TFT M2 1602 is only activated for short periods of time 1507 and without a large $V_{GS}$ bias. The limited positive bias and limited duty cycle are sufficient to enable column scanning using conventional a-Si:H TFTs.

By applying select signals CA[15:0] 1401 in sequence as shown in FIG. 16 (1505 and 1506), a time sequence of voltages on CS[44:0] 1400 1500 can be sampled and temporarily stored on the array of 1720 column capacitors $C_{COLn}$ which feed the pixel array 1405. At the end of a column scan operation, each of the $C_{COLn}$ capacitors (1720 in this example) has a voltage corresponding to a desired pixel level for a given row. The next operation of the array is to write the 1720 column voltages into a chosen row of pixels.

Each of the 1720 columns of the TFT pixel array 1405 is comprised of fifteen row groups 404, each of which contains 1120 horizontal by 8 vertical pixels. Each row group 1104 can be selected by the operation of row demultiplex TFTs, some of which are identified as M3 1103, M4 1104, M5 1105, and M6 1106 in FIGS. 15 and 17.

Each pixel 1406 contains circuitry to control the LCD pixel voltage as well as counteract bias stress on the pixel's TFTs. FIG. 17 shows a single pixel's (upper left corner, row index=0, column index=0) electrical conduction and control paths from the input/output connection points of the TFT substrate 201. Each pixel 1406 1600 requires two control signals for selection, identified as $V_{ROW0}$ 1620 and $V_{ROW1}$ 1621 in FIGS. 15 and 17. A pixel 1406 1600 captures the $V_{COLn}$ voltage of its corresponding column line when a high voltage control signal on the row control lines (e.g. $V_{ROW0}$ 620 and $V_{ROW1}$ 621) causes the pixel storage capacitor $C_{ST}$ 1624 and the column capacitor $C_{COLn}$ (e.g. $C_{COL0}$ 1625) to share charge through pass transistors M7 1607 and M8 1608. In this manner the voltage across the LCD pixel 1406 (e.g. $V_{PIXEL0,0}$ 1622 in FIG. 17) can be independently programmed to generate a desired optical state of the pixel by controlling the voltage across the liquid crystal, shown as capacitor $C_{LC}$ 1623 in FIG. 17. The pixel storage capacitor $C_{ST}$ 1624 is preferably large enough to prevent pixel charge leakage during non-selected periods. $C_{ST}$ 1624 is connected to a common pixel capacitor reference line PC 1627. In addition or in the alternative, the $C_{ST}$ hold capacitance 1624 can have a back plate voltage that is one of the driven lines within the array, e.g. $V_{ROW0}$ 1620. The liquid crystal cell 1204 is shown as a simple capacitor $C_{LC}$ 1623 whose back plate is on the opposing substrate of the LCD 1206 and driven by $V_{COM}$ 1626. $V_{COM}$ 1626 can optionally be driven with an AC waveform to improve cell retention, limit array voltage swings and/or reduce system power.

Pixel source voltage CS0 1609 is connected through a column pass TFT M1 1601 to a typically parasitic hold cap $C_{COL0}$ 1625 when column pass transistor gate control capacitor $C_{CMEM0}$ 1612 has been set high by the action of CG 1610, CA0 1611 and M2 1602 as described above. In addition or in the alternative, an intentional column capacitor can be created to augment the parasitic capacitance on the column line as required to aid the charge transfer from the column capacitor $C_{COL0}$ 1625 into the pixel storage capacitor, $C_{ST}$ 1624. Voltage $V_{COL0}$ 1613 represents the temporarily stored pixel information for a given pixel in its associated column, in the example of FIG. 17 it is column index zero.

In one embodiment, pixel source voltages CS[44:0] 1400 1500 (e.g. CS0 1609) are driven with pixel level voltages representing (although not necessarily equal to) the desired final voltage for the selected pixels. Due to charge sharing in later operations (e.g. the transfer of charge from $C_{COL0}$ 1625 to $C_{ST}$ 1624), the voltage at the pixel, e.g. VPIXEL0,0 1622 will be the driven pixel source voltage at CS[44:0] 1400 1500 (e.g. CS0 1609) modified by the ratio of the sharing capacitances, the initial voltage conditions, the gate-drain capacitance, gate voltage swing, charge splitting and additional parasitic capacitances in the system, among other effects. To reduce the effect of such non-idealities the driven source voltages CS[44:0] 1400 1500 1609 are preferentially pre-distorted to compensate for the voltage modifications expected in the TFT circuit of FIGS. 15 and 17 so that the pixel node voltages, e.g. $V_{PIXEL0,0,1}$ 622, achieve the desired levels to create a desired image on the liquid crystal display.

Figure 18:
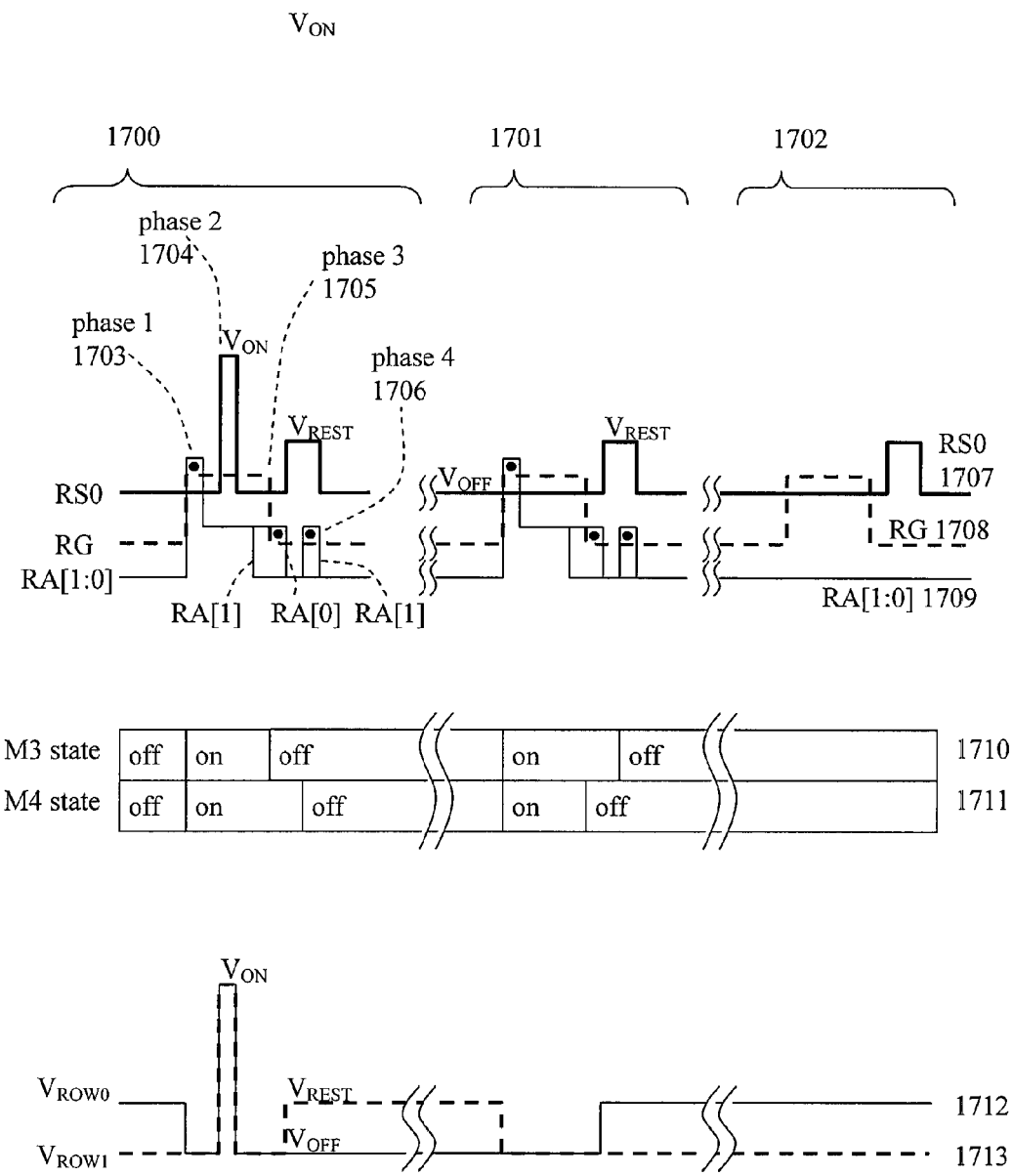
FIG. 18 shows a representative diagram of signal timing waveforms for a row load operation.

The row enable signals for the pixel of FIG. 17 are generated in a four phase row select operation. FIG. 18 shows a timing diagram with example waveforms for both a selected row operation 1700 and the two cases for non-selected row operations 1701 1702. In the first phase 1703 of the selected row case 1700, the row source line RS0 1403 1616 1707 is set to the $V_{OFF}$ voltage level which is preferably chosen to prevent pixel charge leakage from $C_{ST}$ 1624. The common RG line 1408 1614 1708 is set at a voltage enough above the $V_{OFF}$ voltage so that the M3 1603 and M4 1604 TFTs will be driven to an "on" state if selected. Both the RA[1:0] lines 1615 1618 1709 are then set to a voltage above the RG 1408 1614 1708 voltage to allow M5 1605 and M6 1606 to conduct. The conduction is indicated by the black dot in FIG. 18 in phase 1; note that the $V_{GS}$ overdrive required to set an "on" state in M3 1603 and M4 1604 is preferentially kept small to minimize positive voltage stress. The row control capacitors, $C_{RMEM0}$ 1617 and $C_{RMEM1}$ 1619, are consequently programmed to an "on" state 1710 1711 and connect the selected row lines $V_{ROW0}$ 1620 and $V_{ROW1}$ 1621 to the RS0 1403 1616 1707 voltage source. Since the row source and gate voltages are all known and not actively passing high voltages in this phase, the $V_{GS}$ for both the select (e.g. M5 1605 and M6 1606) and row pass transistors (e.g. M3 1603 and M4 1604) can be kept relatively low (e.g. a few volts), limiting the impact of positive stress on the devices. At the end of the first phase, the RA[15:0] lines 1402 are set to a low voltage to freeze the "on" state onto the selected row pass transistors M3 1603 and M4 1604.

In the second phase 1704 of the selected row operation 1700, the RS0 1403 1616 1707 voltage is raised to a high voltage $V_{ON}$ to transfer the charge from the array of 1720 column capacitors $C_{COLn}$ (e.g. $C_{COL0}$) to the selected row of pixel storage capacitors (e.g. $C_{ST}$ 1624). Since the control information was captured onto the $C_{RMEM0}$ 1617 and $C_{RMEM1}$ 1619 capacitors in the first phase 1703, the $V_{GS}$ of the row pass transistor is kept roughly constant independent of the row drive amplitude $V_{ON}$ in FIG. 18. A significant advantage is gained over prior art demultiplexing row drive circuits by avoiding pass transistors that see a high $V_{GS}$ due to passing "off" row voltages. In addition, the highest control voltage to be generated by the external driver IC 1301 is reduced. At the end of the second phase 1704, the RS0 line 1616 1707 is brought back to the $V_{OFF}$ voltage.

In the third phase 1705 of the row select operation, one of the RA[1:0] lines 1709, in this case RA1 1618, is brought to a more negative voltage than RA0 1615. This has the effect of maintaining the "on" state of M4 1604. RG 114 1708 is then brought to a voltage lower than the RA0 1615 voltage, causing M5 1605 to conduct and discharge the $C_{RMEM0}$ 1617 capacitor. This has the effect of turning the M3 1603 pass transistor state to "off" as shown in the M3 state diagram 1710. At the end of the third phase 1705, the RS0 1616 1707 is brought to a mid range potential level $V_{REST}$ which causes $V_{ROW1}$ 1621 to follow RS0 1616 1707 to VEST since M4 1604 is still in the "on" state as shown in 1711 1713.

In the fourth and final phase 1706, the RA1 1618 line is pulsed to a voltage above the RG 1614 voltage so as to discharge the $C_{RMEM1}$ capacitor 1619 and turn M4 1604 to an "off" state 1711. At the end of the fourth phase 1706, the M3 1603 and M4 1604 row pass transistors are in an "off" state 1710 1711. Note that the "on" $V_{GS}$ drive, indicated by the small black dots in FIG. 18 during the first 1703, third 1705 and fourth 1706 phases, is preferentially kept small to minimize the accumulation of positive stress in the demultiplex logic. By limiting $V_{GS}$ while demultiplexing large voltage range signals (e.g. row swings $V_{OFF}$ to $V_{ON}$), the present teachings enable the integration of advanced driver functions into a-Si:H TFT processes.

RA[15:0] 1402 lines are sequentially pulsed in pairs similarly to RA[1:0] 1615 1618 in FIG. 18 to sequentially address each of the pairs of rows in the pixel array. RS[14:0] 1403 lines are sequentially driven with selection signals similar to RS0 1707 to drive row lines in other row groups 1404.

Non selected rows that do not share the same RA[n+1:n] activation pair but do share the same RS [m] line with the selected row are not turned to the "on" state as shown in timing section 1702 of FIG. 18. Non selected rows that do share the same RA[n+1:n] 1402 activation pair but not the same RS [m] with the selected row line are preferentially used to swap the voltages on the pairs of rows to provide stress mitigation for the pixel array transistors M7 1607 and M8 1608 as shown in timing section 1701 of FIG. 18 and described below.

Non selected row waveforms 1701 shown in FIG. 18 occur when a row group's RS [n] line is not driven to the high state $V_{ON}$ to select a pixel row in that group during the second phase of the row programming. In the non selected row example 1701 of FIG. 18, the RS0 1616 1707 line is kept low during the row address phase (phase two 1704). The pattern of M3 1603 and M4 1604 "on" and "off" states 1710 1711 is similar to the pattern seen with the selected row. Preferentially, the timing of the return to "off" state of M3 1603 1710 and M4 1604 1711 is alternated between successive activations of RA[1:0], thus causing the $V_{ROW0}$ 1620 and $V_{ROW1}$ 1621 to preferentially exchange voltage levels between $V_{REST}$ and $V_{OFF}$ during a non-selected row operation such as 1701. Note that the gate voltages on the pixel pass transistors M7 1607 and M8 1608 employ a "break before make" switching transition; this ensures that the pixel charge on $C_{ST}$ 1624 is well protected against rise/fall time variations and charge leakage at row voltage transitions.

The row control lines for each pixel (e.g. $V_{ROW0}$ 1620 and $V_{ROW1}$ 1621 for the first row of pixels) are responsible for maintaining isolation between the stored pixel charge and the column line in between pixel row activations. To achieve sufficiently low leakage in M7 1607 and M8 1608, a negative gate voltage is required. However, due to the desire to reduce frame rate well below the negative stress roll-off frequency shown in FIG. 12, this negative gate voltage must not be applied continuously. In a preferred embodiment of the present teachings, two voltage levels ($V_{REST}$ and $V_{OFF}$) are alternately used on the row lines $V_{ROW0}$ 1620 and $V_{ROW1}$ 1621 to prevent both leakage and negative stress accumulation. By alternating the $V_{ROW0}$ 1620 and $V_{ROW1}$ 1621 voltages between an "off" bias ($V_{OFF}$) and a stress reducing $V_{REST}$ voltage at a frequency similar to fast frame rate displays (e.g. 60 Hz alternation), the effects of negative stress on M7 1607 and M8 1608 of FIG. 17 can be significantly reduced.

In one preferred embodiment, the voltage level $V_{OFF}$ is chosen to be negative enough so that the pixel charge stored on $C_{ST}$ 1624 does not substantially leak away through M7 1607 or M8 1608 between pixel refreshes. Only one of M7 1607 or M8 1608 need be driven by $V_{OFF}$ to achieve low leakage from the pixel. The voltage $V_{REST}$ is preferentially chosen to provide a slightly positive bias to the pixel select TFTs (M7 1607 and M8 1608) which acts to clear out hole accumulation within the channel of the M7 1607 and M8 1608 and consequently interrupt the TFT channel's negative stress accumulation process. The $V_{REST}$ and $V_{OFF}$ voltages are sampled on the $V_{ROW0}$ 1620 and $V_{ROW1}$ 1621 lines and will be held by the parasitic capacitance of the row lines between drive operations.

In addition or in the alternative, a slightly negative or neutral bias can be selected for the $V_{REST}$ voltage. In addition or in the alternative, the RS line 1408 1616 1800 can be modulated with an additional incremental positive pulse between phase three 1705 and phase four 1706 described above that raises RS0 1403 1616 1707 to a higher level than all possible pixel voltages $V_{PIXELn,m}$ in the array. This has the effect of guaranteeing hole expulsion from the TFT channels in M7 1607 and M8 1608 which acts to reset the dominant negative stress accumulation mechanism. The RS0 line 1403 1616 1707 can then be returned to a neutral or slightly negative $V_{REST}$ voltage at the end of the third phase described above to subsequently minimize positive or negative stress in between refresh cycles.

At a 4 Hz frame refresh rate in the present example of a 120 row display, the RA[15:0] 1402 pairs are activated fifteen times during the frame resulting in a row voltage alternation period of 60 Hz, similar to a conventional refresh scanning profile when considering negative stress accumulation. The negative stress effects typically associated with very low frame rates can be suppressed while at the same time the pixel charge on $C_{ST}$ 624 can be substantially preserved with one of the M7 1607 or M8 1608 TFTs in a strongly negative off state.

By modulating the $V_{ROW0}$ 1620 and $V_{ROW1}$ 1621 lines seen by each row in opposite directions, the parasitic coupling of the row lines to the pixel node $V_{PIXEL0,0}$ 1622 is balanced to reduce flicker artifacts. The power required to modulate the row lines between $V_{REST}$ and $V_{OFF}$ is relatively low compared to the leakage in LTPS pixel memory circuits; the present teachings provide a method to achieve a low leakage state on a dynamic pixel charge without incurring the high power budget associated with a-Si:H TFT 60 Hz frame refresh or the high cost of LTPS integrated pixel memory.

The exact number of column scan operations (FIG. 16) and row load operations (FIG. 18) is dictated by the display resolution and designer choices on the partition of columns, pixels row source lines and row select lines; the present teachings are not limited to a particular number of column scan operations nor the exact number and/or sequence of scanning pulses on the column demultiplexing gates or sources. Similarly the present teachings are not limited to a particular number of row load operations or the exact number and/or sequence of scanning pulses on the row demultiplexing gates or sources.

The positive stress on the column select gates CA[15:0] 1401 is much higher than the positive stress on the pixel gate lines $V_{ROW0}$ 1620 and $V_{ROW1}$ 1621 due to the higher positive duty cycle of the column select gates during the column scan operation shown in FIG. 16. In one embodiment of the present teachings the column gate voltages on M1 1601 and M2 1602 can be driven to a negative voltage during the row load operation of FIG. 18 to intentionally create negative stress to compensate for the accumulated operational positive stress. By applying a non-operational (i.e. not display refreshing) time or amplitude modulated signal during row load operations when columns are otherwise inactive, negative stress on the column pass TFTs M1 1601 or column control TFTs M2 1602 can be intentionally and proactively applied in measured amounts to counterbalance the accumulation of positive stress during the operational column scan operation.

Similarly the positive stress on the row select TFTs (e.g. M3 1603, M4 1604, M5 1605 and M6 1606) is much higher than the positive stress on the pixel gate lines $V_{ROW0}$ 1620 and $V_{ROW1}$ 1621 due to the higher positive duty cycle of the row select control signals RA[15:0] 1402 during the row load operation of FIG. 18. In one embodiment of the present teachings the row control signals can be driven to a controlled negative stress condition during the column scan operation to intentionally generate negative stress to compensate for the accumulated operational positive stress. By applying a non-operational (i.e. not display refreshing) time or amplitude modulated signal during the column scan operations depicted in FIG. 16 when rows are otherwise inactive, negative stress on the row control TFTs (e.g. M3 1603, M4 104, M5 1605 and M6 1606) can be intentionally and proactively applied in measured amounts to counterbalance the accumulation of positive stress during the operational row load operation or row alternation depicted in FIG. 18.

By tailoring the pulse durations, negative stress periods and gate positive and negative voltages appropriately, the positive and negative stress can be balanced across all the gate drive types (column selects, row selects, column controls, row controls, and pixel selects) required to support the column and row drive system described by the present teachings.

In an additional or alternative embodiment, the $V_{GS}$ overdrive applied to turn "on" the demultiplex TFTs can be adjusted over the life of the panel to compensate for stress induced threshold shifts in the demultiplex TFTs by monitoring the dynamic current on the source lines (e.g. CG 1408, RG 1408, CS[44:0] 1400 or RS[14:0] 1403) during the various charging intervals described above to ensure that the charged capacitors (e.g. $C_{CMEMn}$, $C_{RMEMn}$, $C_{COLn}$, $C_{ROWn}$ respectively) settle to a final voltage in the time allocated (i.e. dynamic current approaches zero at the end of the interval). The present teachings confer the ability to adjust dynamically and independently the overdrives of the various different demultiplex transistor types (e.g. M1 1601, M2 1602, M3 1603 and M5 1605) in response to varying frame rate and threshold shift conditions. In one important aspect of the present teachings, the gate overdrive voltage of M1 1601, M2 1602, M3 1603 and M5 1605 and similar TFTs can be significantly adjusted to higher voltages without increasing the overall voltage range of the driver IC 1301 as the highest generated voltage (typically $V_{ON}$ on the row lines) is often significantly higher than the gate overdrive signals with an un-aged panel. By compensating for induced bias stress with additional gate overdrive that does not affect the driver IC voltage range, the present teachings provide a significant operational advantage without increasing cost.

While described using a specific embodiment of a 240×120 RGB display, the present teachings can be generally applied to any demultiplexer based display system that has TFT or switching devices with asymmetric and nonlinear positive and negative stress accumulation mechanisms.

The stress control waveforms described above can be predetermined to compensate for known drive waveforms and a known TFT stress nonlinearity. Without relying on feedback, such a system is known in the art as a feed-forward compensation system.

In an additional or alternative embodiment, the display controller IC 1201 can insert one or more additional stress monitoring steps into one or more frame periods. In one embodiment of stress monitoring, an AC signal is applied to the CS [44:0] 1400 pixel source signals. The column select gate lines CA[15:0] 1401 and CG 1407 lines are set to a known voltage or swept through a sequence of voltages. The AC impedance of the CS[44:0] lines 1400 and/or the CG lines 1407 can be measured by the display controller IC 1201 using a decay time or multipoint frequency response method or other impedance measuring methods as are well known in the art. Since the $C_{COLn}$ capacitances (e.g. $C_{COL0}$ 1625) are relatively stable over the lifetime of the display, the resistance of the column pass transistors (e.g. M1 1601) can be computed from the measured AC impedance directly. Threshold voltage shifts in the column pass TFTs 1601 can be directly monitored with this method and the negative stress reduction modulation described above can be applied using a feedback control loop, for instance, to regulate the TFT threshold voltage directly.

Similarly, the row select transistors can be monitored as well by setting the row pass TFTs (M3 1603 and M4 1604) to one or more test voltages simultaneously while measuring the AC impedance from RS[14:0] 1403 1616 and/or RG 1408 1614. Based on this measurement, a control loop can then modulate the negative bias applied to the row pass gates of M3 1603 and M4 1604 and/or row select gates of M5 1605 and M6 1606 to adaptively correct the accumulated operational stress. In addition or in the alternative, one or more non-operational stress monitoring devices may be fabricated on the flat panel, preferably one or more for each type of gate drive waveform, that can then be monitored directly for threshold voltage shifts (using, e.g., AC impedance, a constant drain-source current or other threshold or impedance monitoring techniques known in the art).

As described above, the accumulation of negative stress can be avoided in many cases by keeping $V_{GS}$ as close to zero as possible during operation. In an additional embodiment, a standby state can be added in which the $V_{GS}$ of each type of gate can be uniquely controlled to compensate for operational threshold shift. Amplitude and timing modulation can effectively tailor the accumulated negative stress to compensate for positive stress during such a standby period. In a preferred embodiment, the waveforms and levels used in a standby de-stress state are chosen to minimize transitions and power dissipation.

In addition or in the alternative to the AC impedance method described above, dedicated stress monitoring devices can be added to the display depending on the exact monitoring and compensation requirements. The particular arrangement of compensation devices and shared pins, if any, are a design choice.

In addition or in the alternative, switching devices other than a-Si:H TFTs may have a negative stress mechanism that dominates during the operational period and may require a positive stress control mechanism functionally similar to the one described above. However, there is no limitation to the polarity of the operational stress and the corresponding anti-polarity of the controlled compensating stress.

In conventional driver or demultiplex circuits the opportunity for stress compensation is usually very limited due to the data dependence of the accumulated stress and/or the inaccessibility or lack of control of many of the TFTs as required for stress compensation. In contrast, the present teachings are well suited for stress compensation due to the data-independent nature (i.e. evenness) of the accumulated stress patterns (allowing large scale parallel stress compensation for the whole panel), the ability to access both the sources and gates of the demultiplexing driver TFTs, and the option to perform stress decomposition on the TFT system while it is still showing an image.

In addition or in the alternative, the stress modulation technique can encompass a wide variety of techniques, including but not limited to amplitude modulation, frequency modulation, pulse width modulation, or combinations thereof. In addition or in the alternative, the stress control period, one or more optional stress monitoring periods, and the frame update period can be temporally interleaved to affect a modulation of the compensating stress to the extent allowed by the nonlinear stress accumulation characteristics of the TFT devices.

Many choices on the specifics of the stress monitoring and stress modulation methods are available to designers skilled in the art; there is no limitations on such design decisions. Modifying the device drive waveforms during a stress control period to balance the accumulated operational stress by forming a closed loop system as described in the present teachings is not limited by the specifics of the stress polarity, stress monitoring structure or method, nor the stress modulation method.

Persons skilled in the art will recognize that a wide variety of display resolutions, specific scanning waveforms, demultiplexing circuits, stress monitoring device configurations (either dummy or operational), stress monitoring processes can be chosen to implement the present teachings.

Figure 19A:
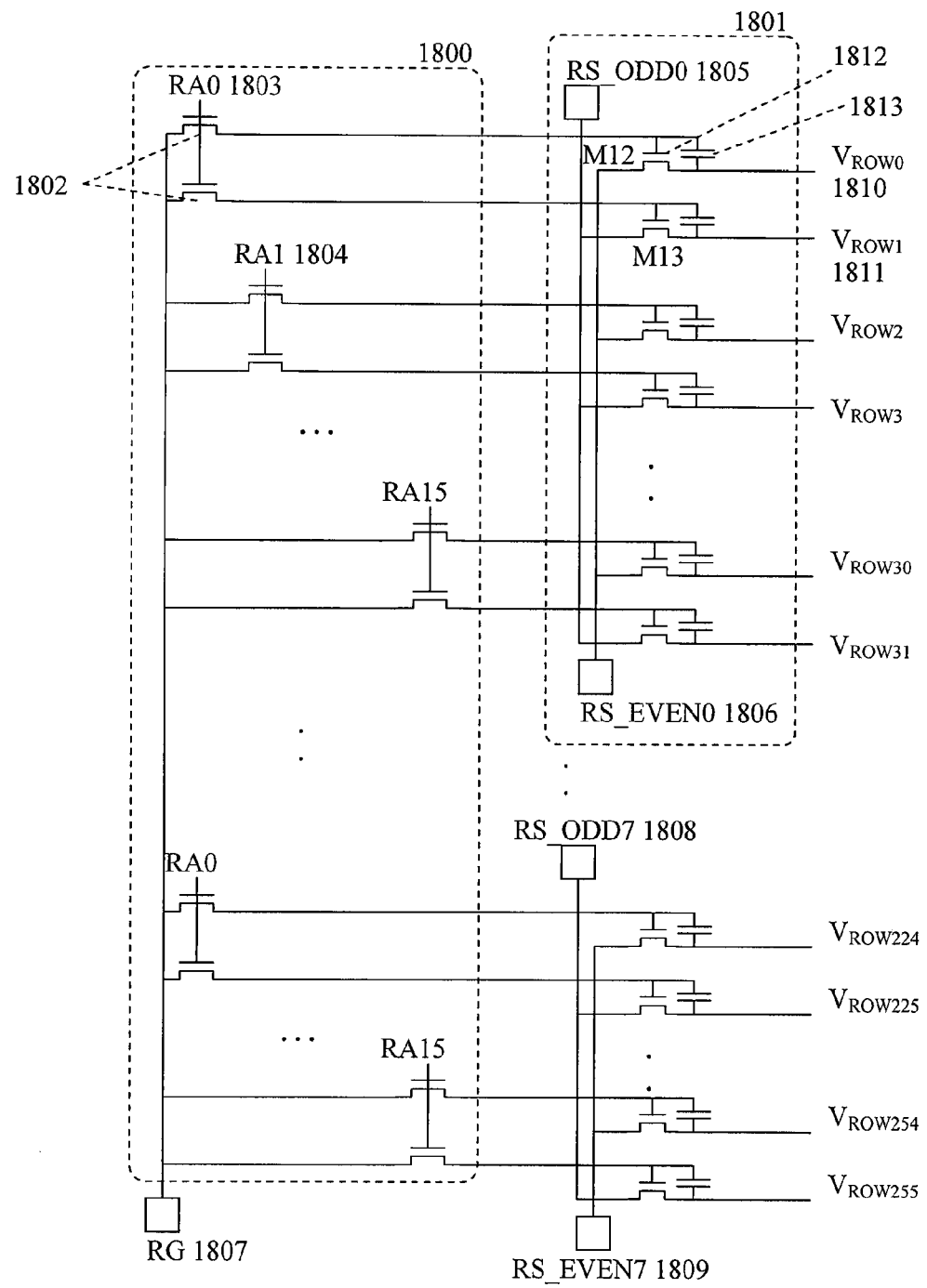
FIG. 19a shows a representative schematic of a row demultiplex sub-circuit.

FIG. 19a shows an alternative embodiment of a row demultiplexer according to the present teachings which is comprised of an array 1800 of paired row control TFTs 1802 that are gated by RA[15:0] (e.g. 1803 1804). The vertical resolution of the example in FIG. 8a is 128 pixels with 2 row control lines per pixel. The row source voltage RS is split into two nets, RS_EVEN[7:0] (e.g. 1806 1809) and RS_ODD[7:0] (e.g. 1805 1808) in FIG. 19a. TFTs 1802 set the gate-source voltages of M12 1812 and M13, stored on capacitors such as 1813. In a preferred embodiment, the state of the row pass transistors (e.g. M12 1812 and M13) is set by setting the $V_{GS}$ of M12 and M13 to a positive value using TFTs 1802. Once a positive $V_{GS}$ is established on M12 1812 and M13, the corresponding RS source line can drive the associated row line into the pixel array, e.g. $V_{ROW0}$ 1810 can be driven from RS_EVEN0 1806 when M12 1812 is programmed to an "on" state.

Figure 19B:
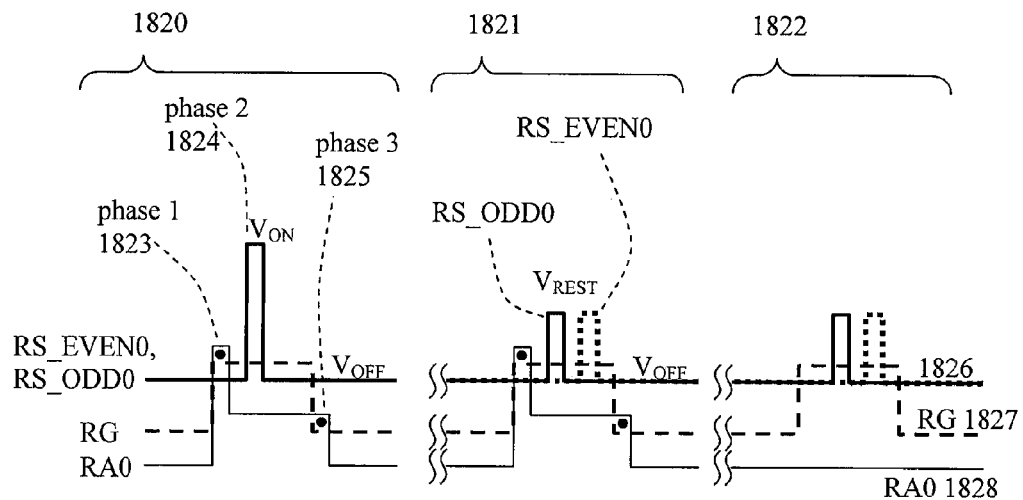
Figure 19B:
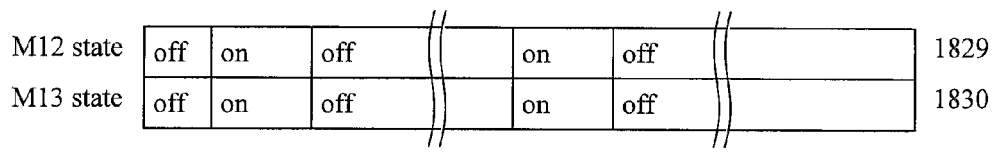
Figure 19B:
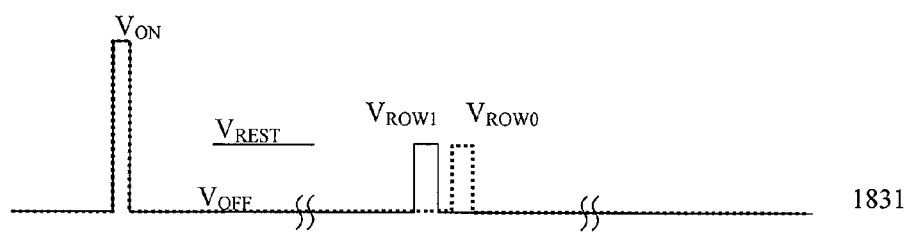

FIG. 19b shows a timing diagram for a selected row 1820 and two cases of a non-selected row 1821 1822 operation for the first row of pixels in the schematic of FIG. 19a. The selected row operation 1820 is divided into three phases, the first of which 1823 sets the RS_EVEN[7:0] and RS_ODD[7:0] lines to a known low voltage $V_{OFF}$ that is sufficiently negative to prevent pixel charge leakage in the two transistor pixel 1600 of FIG. 17. The RG line 1807 is set to a voltage above $V_{OFF}$ and the RA0 lines 1803 are set to a voltage above the RG voltage 1807 as shown in waveforms 1826, 1827 and 1828 in FIG. 19b. As a consequence, the TFTs 1802 conduct and M12 1812 and M13 are programmed to an "on" state as shown in state waveforms 1829 and 1830.

In the second phase 1824 of the row select operation in FIG. 19b, the RS_EVEN0 1806 and RS_ODD0 1805 lines are both brought to a high voltage $V_{ON}$ that is passed through row pass gates M12 1812 and M13 to $V_{ROW0}$ 1810 and $V_{ROW1}$ 1811 as shown in the output waveform 1831. At the end of the second phase 1824 the RS_EVEN0 1806 and RS_ODD0 1805 lines are brought back to a low voltage $V_{OFF}$.

In the third and final phase 1825 shown in FIG. 19b, the RG 1807 line is brought to a voltage sufficiently low to allow the control TFTs 1802 to conduct and discharge the row state capacitors (e.g. 1813). This returns the states of M12 1829 and M13 1830 to the "off" condition.

For a non-selected rows that do not share a RA[15:0] line but do share an active RS_EVEN[7:0] and RS_ODD[7:0] line with the selected row (timing group 1822), neither the output rows nor the switch states are activated. For non-selected rows that do share a RA[15:0] line but not an active pair of RS_EVEN[7:0] and RS_ODD[7:0], the operation is shown in waveform group 1821 in FIG. 19b. The RG 807 1827 and RA0 803 1828 voltage waveforms seen by the non-selected row transistors are the same as the selected row; they have the same effect to turn the M12 1829 and M13 1830 states to an "on" condition. Once in the "on" condition, first the RS_ODD0 line 1805 is pulsed to a mid level potential $V_{REST}$ and then returned to $V_{OFF}$. In a preferred embodiment of the present teachings, all the RS_ODD[7:0] lines that are not selected to drive the pixel array with $V_{ON}$ are pulsed in the same manner. The $V_{REST}$ voltage is chosen to be sufficiently positive to reset the negative stress accumulation mechanism in the pixel TFTs M7 1607 and M8 1608 of FIG. 18. Then the RS_EVEN0 line 1806 is similarly pulsed to $V_{REST}$ and returned to $V_{OFF}$. In a preferred embodiment of the present teachings, all the RS_EVEN[7:0] lines that are not selected to drive the array with $V_{ON}$ are pulsed in the same manner. As a result of the positive pulses seen by the pixels shown in the right hand side of waveform 1831, the non-selected pixel rows in timing group 1821 undergo a negative bias stress accumulation reset at a rate higher than the frame rate (in this example 8× faster) which allows lower frame rates without the accumulation of significant negative stress.

Those skilled in the art will recognize the voltage levels, timing waveforms and sequence of operations such as inverting the order of the RS_EVEN0 1806 and RS_ODD0 1805 row de-stress pulses can be modified to meet specific design requirements, e.g. a frame rate, display resolution, pin count, voltage range, etc. The present teachings describe a method by which the demultiplex operation is broken into multiple phases (e.g. select and turn "on", pass high voltage signals, turn "off") that can be generally applied to many high voltage demultiplex system needs. The present teaching provide a technique wherein high voltage signals (in the example of FIGS. 19a and 19b one or more row voltages) can be driven by a selection demultiplexer that is set up using only low $V_{GS}$ control signals to affect a binary "on"/"off" state on a set of capacitors. By limiting the decode logic phase of the demultiplex operation to low data-independent $V_{GS}$ voltages the positive stress normally associated with pass-gate demultiplexing in a-Si:H TFTs is substantially mitigated without restricting the voltage ranges of the input/output signals of the demultiplexer during the second operational phase of the demultiplexer.

Figure 19C:
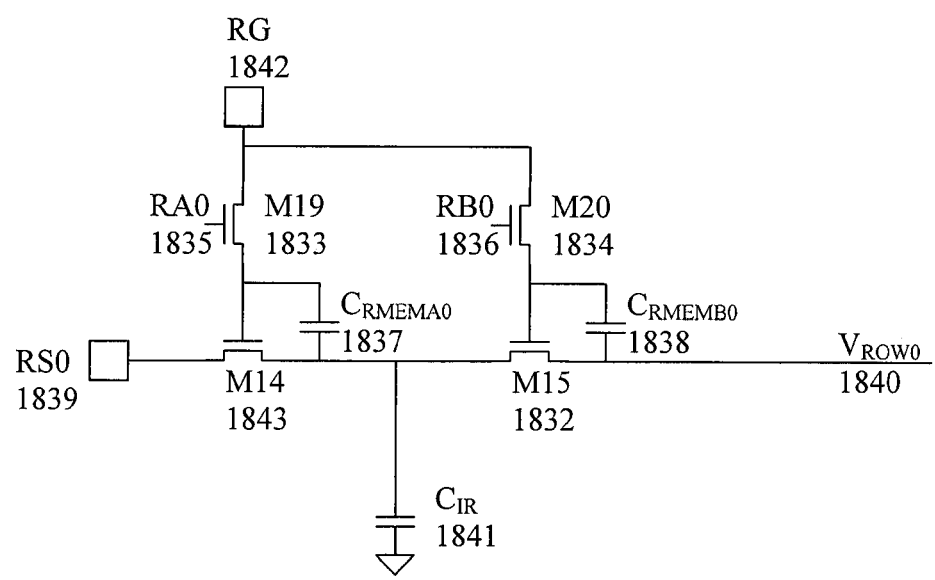
FIG. 19c shows a representative schematic of a two level row demultiplex sub-circuit.

FIG. 19c shows a two level demultiplex subcircuit; only one output line is shown ($V_{ROW0}$ 1840). Two pass TFTs M14 1843 and M15 1832 are set to an "on" or "off" state by low $V_{GS}$ decoding of the RA0 1835 and RB0 1836 lines substantially similar to that described above for FIG. 19b to set the "on" or "off" $V_{GS}$ voltage onto capacitors $C_{RMEMA0}$ 1837 and $C_{RMEMB0}$ 1838 using voltage levels supplied by a common RG line 1842. If both M14 1843 and M15 1832 are set to an "on" state, the RS0 line 1839 can drive the $V_{ROW0}$ line 1840 to achieve a desired output voltage level. To aid in turning M14 1843 to an "off" state at the end of the demultiplex operation, an optional intermediate row capacitor $C_{IR}$ 841 can act to tether the non-driven side of $C_{RMEMA0}$ 1837 when M19 1833 discharges the gate of M14 1843. The parasitic capacitance on the $V_{ROW0}$ line 1840 provides a similar function for $C_{RMEMB0}$ 1838 when M20 1834 discharges the gate of M15 1832. An optional capacitor (not shown) can be added similarly to $V_{ROW0}$ 1840 to provide additional discharge support.

Similar subcircuits (not shown) are attached to other row lines (not shown) to form a complete row demultiplexer. The common RG line 1830 goes to all row drive subcircuits. The RS0 line 1839 is one of $N_{RS}$ row source lines, the RA0 line 1835 is one of $N_{RA}$ row select lines, and the RB0 line 1836 is one of $N_{RB}$ row select lines. The number of output row lines that can be driven by an array of similar subcircuits as FIG. 19c that share $N_{RA}$, $N_{RB}$ and $N_{RS}$ control lines (with a unique combination of RS[i], RA[j] and RB[k] for each output row line) is $N_{TOTAL}=N_{RA}*N_{RB}*N_{RS}$. The total number of control lines necessary for this demultiplexer is $N_{RA}+N_{RB}+N_{RS}+1$. For large numbers of row lines typically found in flat panel displays, the present teachings enable a substantial reduction of pin count, e.g. a 1024 row display requires 1024 driver IC pins if driven conventionally; with $N_{RS}=16$, $N_{RA}=8$ and $N_{RB}=8$, the total number of pins required for row demultiplex is 33, a 97% reduction in row drive pin count.

Those skilled in the art will recognize the extensibility of the present teachings to higher levels of demultiplexing, e.g. a three level mux. The present teachings are not particularly limited by the number of mux levels or the number of row source or row control signals.

Figure 20:
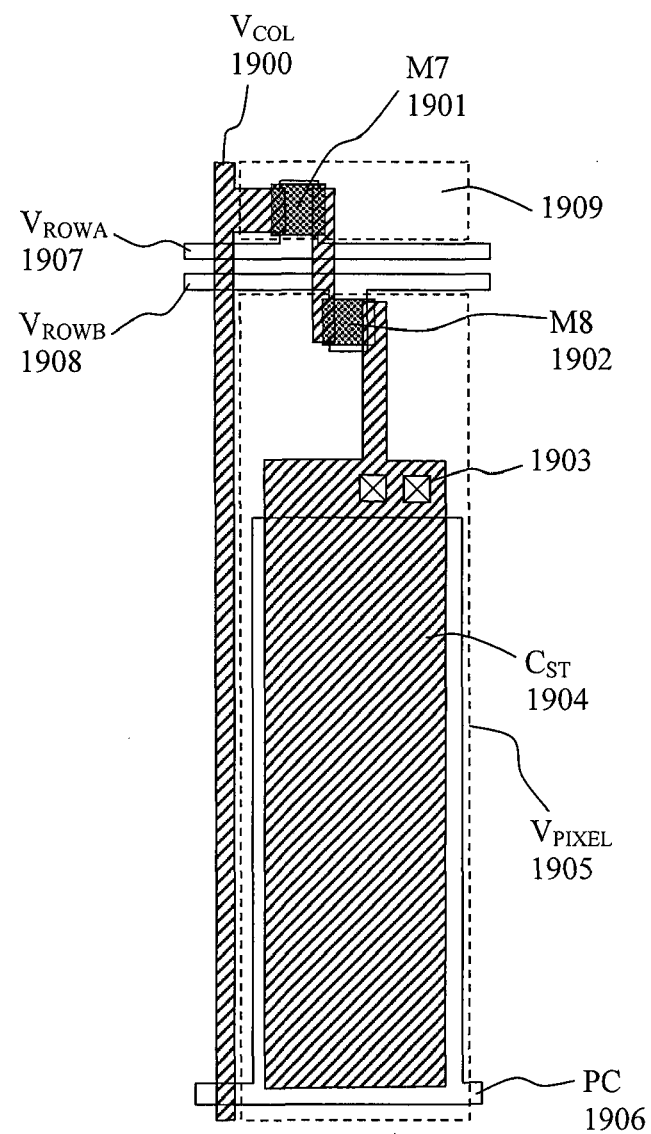
FIG. 20 shows a representative pixel circuit layout.

FIG. 20 shows an example pixel layout of the present teachings in a standard two metal a-Si TFT LCD technology that can be tiled horizontally and vertically to form a large array of pixels. Those skilled in the art will recognize the present teachings may be applied to other TFT processes with different design rules and layers; the choice of process exhibited in FIG. 20 is for illustration purposes and is not a limitation of the present teachings. Also, the layout of FIG. 20 has many permutations, transpositions, reorientations, flips, routings, rotations and combinations thereof that do not substantially modify the electrical behavior of the circuit and are considered within the scope of the present teachings. Based on the present teachings, advantageous layout configurations of the equivalent circuit that minimize crosstalk, improve image quality, adjust storage capacitance, reduce power, improve stability, improve manufacturability and modify performance of the device based on the particular TFT process and application requirements will become evident to those skilled in the art and are considered within the scope of the present teachings.

The two transistor pixel 1600 layout in FIG. 20 comprises two series TFT devices M7 607 1901 and M8 1608 1902 that allow the transfer of charge to occur between $V_{COL}$ 1613 1900 and $V_{PIXEL}$ 1622 1905. The row signals $V_{ROWA}$ 1907 and $V_{ROWB}$ 1908 run horizontally across the pixel array 1405 and are driven by pairs of row signals such as $V_{ROW0}$ 1620 and $V_{ROW1}$ 1621 of FIG. 17. The storage capacitor $C_{ST}$ 1624 1904 is connected to a back plate node PC 1627 1906. The pixel storage capacitor, $C_{ST}$ 1624 1904, is preferably attached via one or more contacts 1903 to a reflective electrode 1905 1909 1203 that is the bottom plate of the liquid crystal capacitance, $C_{LC}$ 1623. The opposing electrode 1211 forms the other plate of $C_{LC}$ 1623 and is attached to a common pixel voltage $V_{COM}$ 1626. The RMS difference in voltage between $V_{PIXEL}$ 1622 1905 and $V_{COM}$ 1626 determines the optical state of the liquid crystal 1204. In a preferred embodiment of the present teachings the reflective top electrode 1905 is designed to minimally overlap the column signal $V_{COL}$ 1900 to minimize parasitic coupling between $V_{COL}$ 1900 and $V_{PIXEL}$ 1905. In an additional embodiment, the reflective top electrode 1905 is designed to minimally overlap the row signals $V_{ROWA}$ 1907 and $V_{ROWB}$ 1908 to minimize parasitic capacitance. In an alternative embodiment, the reflective top electrode 1905 is designed to maximize the reflective area to boost reflectivity of the display. In yet another embodiment, the reflective top electrode 1905 is designed to not occupy the full area of the pixel so as to permit the manufacture of a transparent area per pixel (not shown) to create a transflective display as is commonly known in the art. Such modifications and particular embodiments can be tailored to the display application; the present teachings do not limit the optical arrangement of reflective and transmissive elements.

Figure 21:
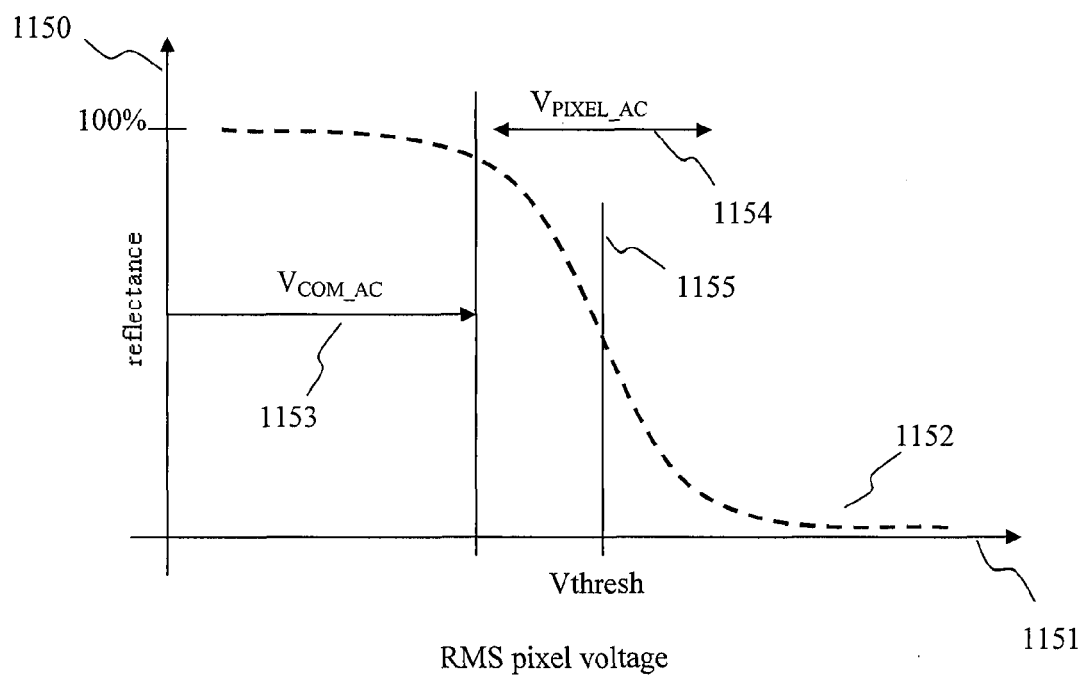
FIG. 21 shows a representative variation in the reflectance of a reflective display with applied RMS pixel voltage.

In one embodiment, the $V_{COM}$ 1626 node is modulated continuously to reduce the required voltage range of the TFT devices and/or reduce power. FIG. 21 shows a representative LCD reflectance 1150 as a function of applied RMS voltage 1151. An AC signal on the $V_{COM}$ 1626 electrode induces a common RMS voltage on the entire pixel array $V_{COM\_AC}$ 1153. The additional pixel information 1154 is additive RMS voltage and controls the optical state of the flat panel. Typically $C_{ST}$ 1624 is much larger than $C_{LC}$ 1623 so that modulation of the $V_{COM}$ signal can provide substantial RMS energy to the LCD efficiently without as much power penalty as modulating the pixel voltage (and hence $C_{ST}$ 1624) directly.

The choice of two row select gates per pixel M7 1607 and M8 1608 in FIG. 17 is for illustration purposes only; in practice the number of row transfer TFTs in each pixel will be a design choice based on the TFT process parameters, the size and resolution of the display, the desired frame rate, the allowable flicker and other performance criteria. In the present teachings two or more row transfer TFTs are required to prevent negative stress accumulation at very low frame rates as described herein. Such choices are considered within the scope of the present teachings.

Figure 22:
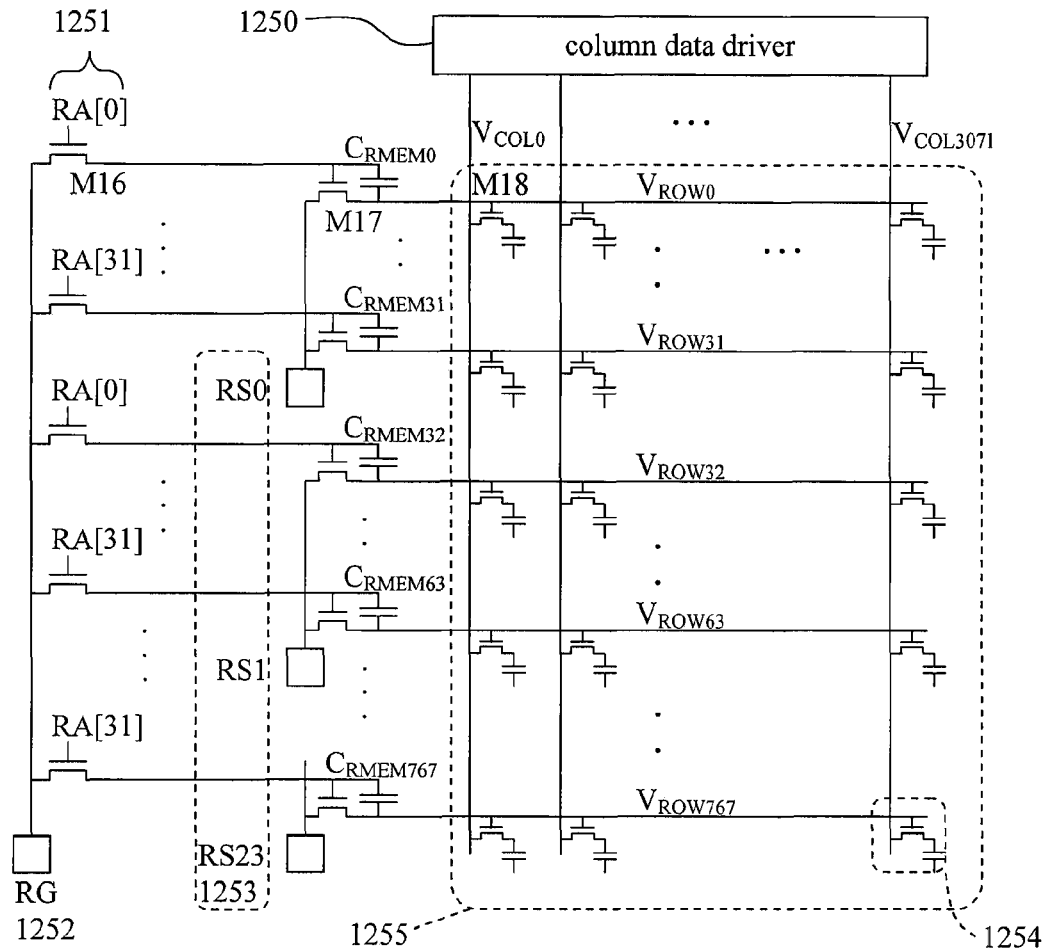
FIG. 22 shows a representative electrical schematic of a TFT substrate containing 3072×768 pixels and associated drive waveforms.
Figure 22:
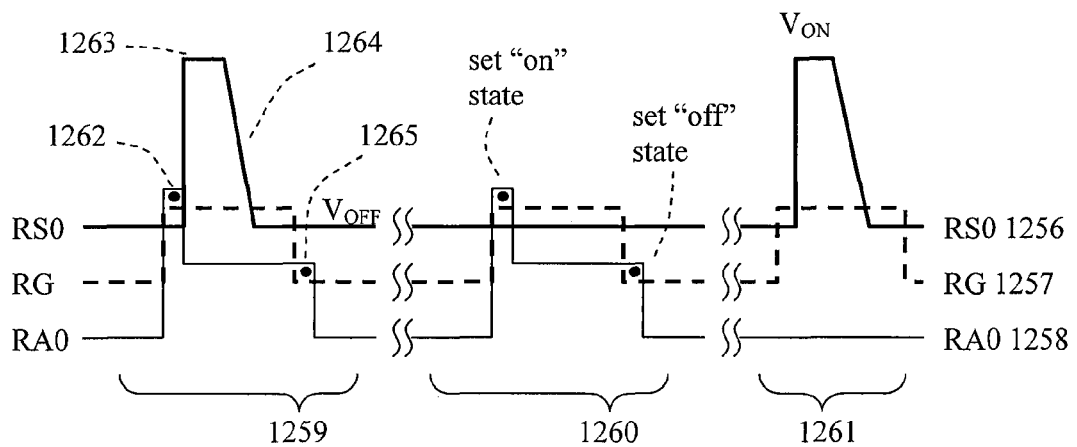

FIG. 22 shows an alternative application of the present teachings to a conventionally scanned TFT display. In this example, the resolution of the display is 1024 RGB horizontal by 768 vertical pixels, or 3072 by 768 electrical pixels. A pixel array 1255 is comprised of an array of pixel cells 1254 containing a conventional single TFT per pixel (e.g. M18 in FIG. 22). The column lines, indicated by $V_{COL0}$ to $V_{COL3}$071 are driven from a conventional column driver IC 1250 that can apply an array of voltages on the column wires that can then be sampled into the pixel array 1255. The function of the row demultiplexing circuit is to sequentially pulse the row lines (indicated by $V_{ROW0}$ to $V_{ROW767}$ in FIG. 22) high as required by the conventional row scanning process as is well known in the art.

A three phase row select operation 1259 is shown in FIG. 22. In the first phase 1262 of the row select operation the RS[23:0] lines 1253 are brought to the low row control voltage (e.g. $V_{OFF}$) as before. The RG voltage 1252 is set to a voltage that is sufficiently high to turn on M17 of FIG. 22. One of the RA[31:0] lines 1251 is then driven to a voltage enough above the RG 1252 voltage so that the row control capacitors corresponding to the selected RA[31:0] 1251 line (i.e. every $32^{nd}$ row, $C_{RMEM0}$, $C_{RMEM32}$, . . . ) in FIG. 22 is programmed to an "on" state by the voltage applied on the RG pin 1252. The RA[31:0] lines are then returned to a low voltage as shown in waveform 1257. At the end of this first phase, a number of rows pass TFTs (e.g. M17 in FIG. 22 for the first row, 24 total in this example) have been turned to the "on" state.

In the second phase 1263 of the row select operation 1259, the desired row's RS[23:0] 1253 line is pulsed high to $V_{ON}$ to drive a single row select signal into the pixel array 1255. In a preferred embodiment of the present teachings, the RS[23:0] waveform is given a slower fall time 1264 to allow for settling time of the row pass transistor M17 in FIG. 22. In addition or in the alternative, the rising edge of the gate voltage on the selected RA[31:0] 1251 can be given a slower rise time to keep the $V_{GS}$ of the row pass TFT (e.g. M17 in FIG. 22) as low as possible during switching events. Those skilled in the art will recognize that a wide variety of rise and fall rates can be applied to the present teachings for various effects. The present teachings are not particularly limited by the choice of rise and fall times of the driving signals.

In a third and final phase of a row selection 1265, the same RA[31:0] select line 1251 selected above is made sufficiently positive above a low RG 1252 voltage to discharge to $C_{RMEMn}$ capacitor and return the row switch states to all "off".

The non-selected cases are similar to those described above; the non-selected row operation 1260 in FIG. 22 receives the RA[31:0] activation 1258 but not the RS[23:0] activation 1256. In this case the row voltage is held at $V_{OFF}$. The non-selected row operation 1261 is for the case where the row receives the RS[23:0] pulse but does not receive the RA[31:0] activation. As shown in timing group 1261 the switch state is maintained at the "off" state similar to that depicted in FIG. 19b. Thus the non-selected rows to a constant $V_{OFF}$ are driven as required by conventional scanning.

Those skilled in the art will recognize that the exact sequence of the actions taken, e.g. that the rows are processed sequentially, can be modified to achieve a similar end. Some advantageous changes, e.g. writing all even rows first, then all odd rows, and/or partial display refresh can be adapted to the present system to reduce voltage swings and power dissipation by minimizing transitions while performing any number of inversion techniques, including row, column, frame and dot inversion DC balancing. Such modifications and permutations are considered within the scope of the present teachings.

Many applications of flat panels can make use of a variable frame rate or variable area refresh; the present teachings are particularly well suited to applications where the frame rate must run fast for certain types of content (e.g. 30 Hz frame rate when the user is actively interacting with the device) but also needs a low power state where frame refresh rate can drop to a few Hz. To achieve this with the present teachings, the control gate voltage overdrive of the row and column pass transistors can be temporarily increased to speedup the TFT settling time. As long as such high frame rates are not sustained for long periods of time, the positive stress accumulation of high frame rate operation is minimal. In an additional embodiment, the modulation of negative stress as described above in the present teachings can advantageously compensate for excess positive stress accumulated by temporary higher frame rate operation.

Figure 23:
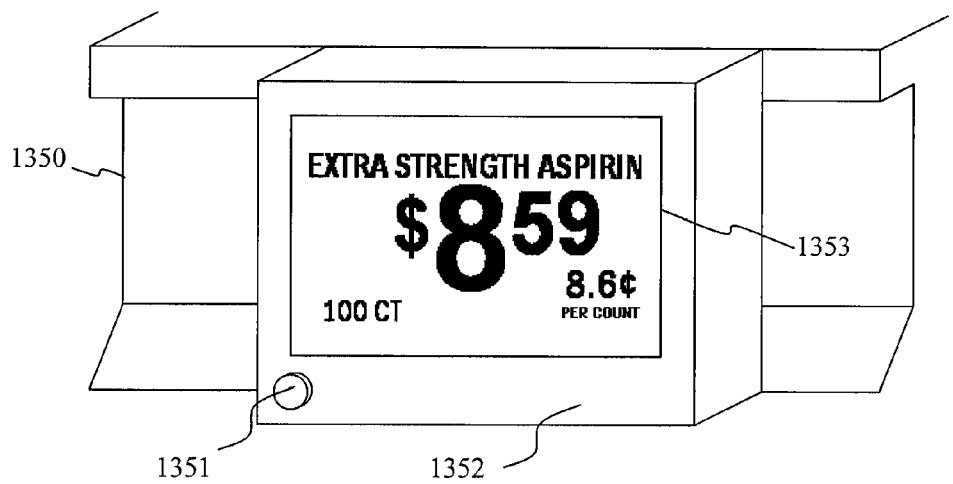
FIG. 23 shows a representative electronic shelf label with a display.

FIG. 23 shows an electronic shelf label 1352 integrating the flat panel display of the present teachings 1353 into a device that can be attached to a store shelf 1350 to display product information and pricing. An interactive button 1351 can be used to provide additional information to store personnel or shoppers.

Figure 24:
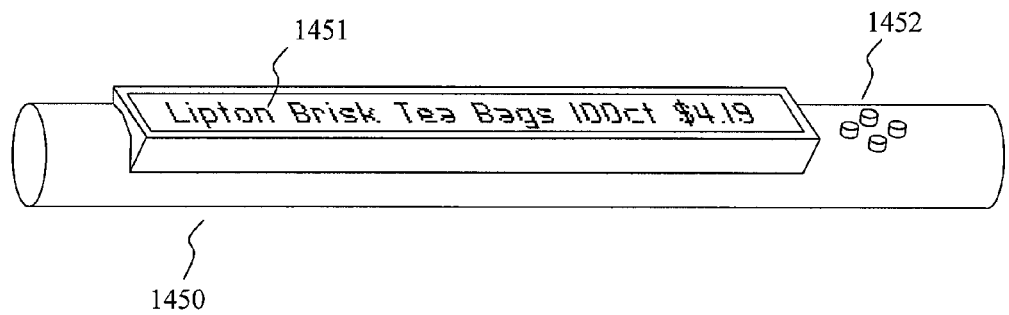
FIG. 24 shows a representative electronic shopping cart handlebar with a display.

FIG. 24 shows a shopping cart handlebar mounted display utilizing the present teachings. A display 1451 is attached to a shopping cart handlebar 1450. One or more buttons or a keypad 1452 allows for user input.

Figure 25:
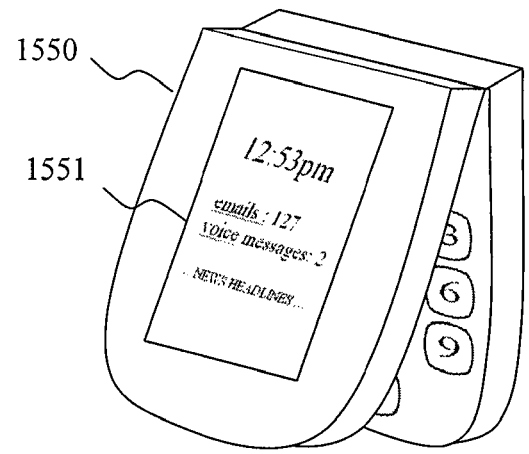
FIG. 25 shows a representative cell phone with a display.

FIG. 25 shows a clamshell cell phone design utilizing the present teachings. A low power reflective outer screen 1551 is integrated into the lid of the cell phone 1550.

Figure 26:
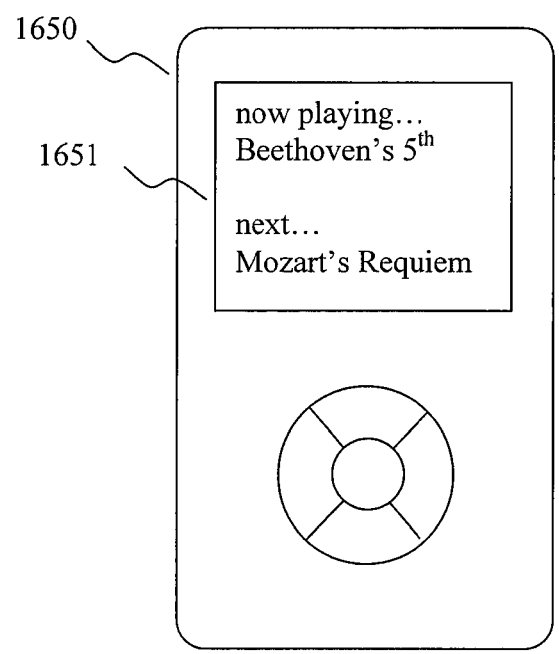
FIG. 26 shows a representative portable music player with a display.

FIG. 26 shows a portable digital music player 1650 integrating a display based on the present teachings 1651.

Figure 27:
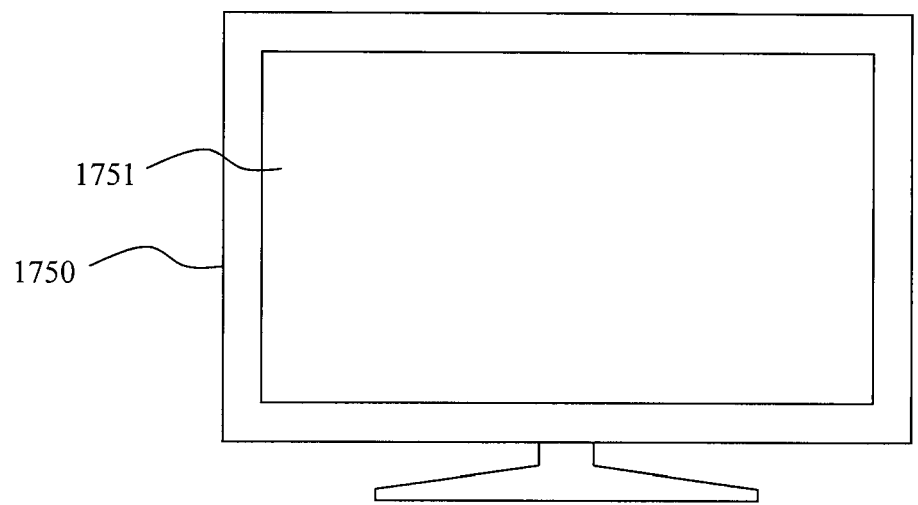
FIG. 27 shows a representative flat panel TV, monitor or digital signage with a display.

FIG. 27 shows a computer monitor, promotional signage or television 750 with a display based on the present teachings 751.

Figure 28:
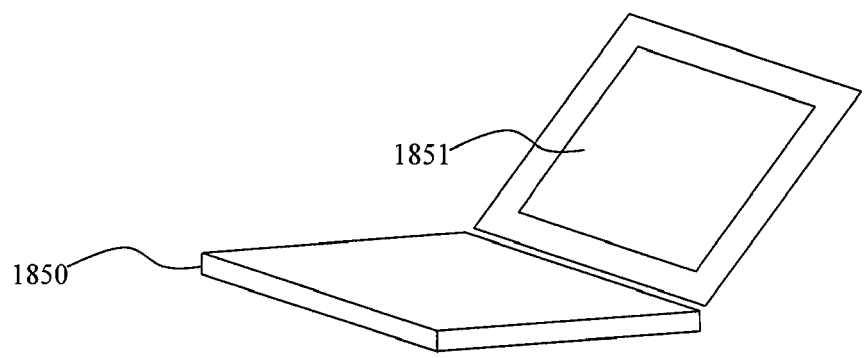
FIG. 28 shows a representative notebook computer or portable DVD player with a display.

FIG. 28 shows a portable computer or portable DVD player 1850 with a display based on the present teachings 1851.

FIGS. 29 through 37 show an alternative embodiment of the present teachings of a 208×RGB×160 display described below.

Figure 29:
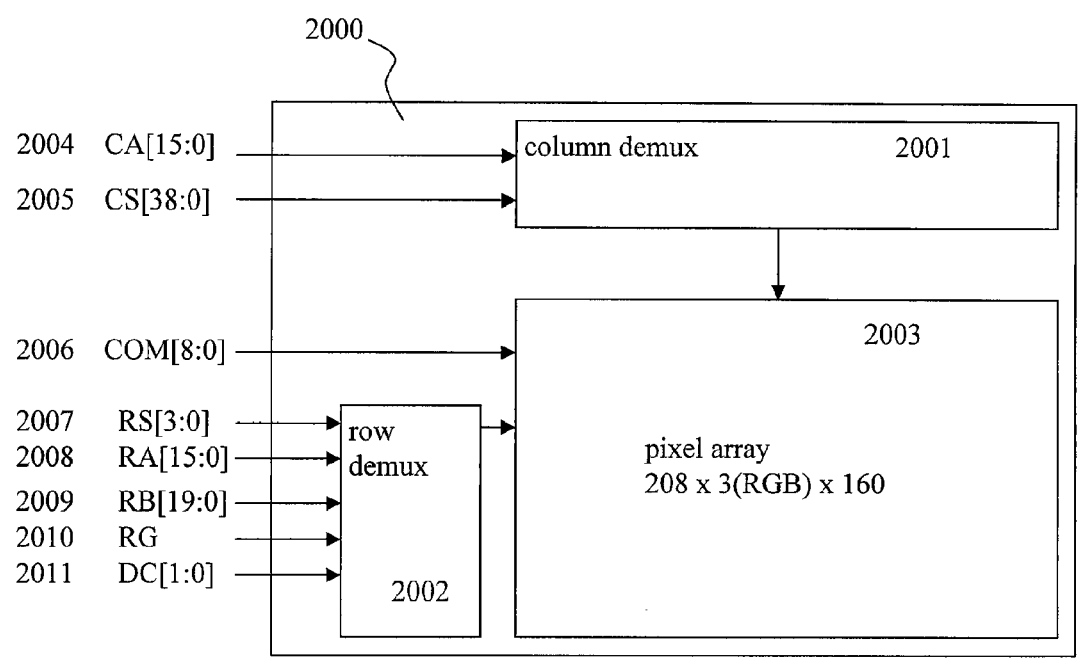
FIG. 29 shows a representative block diagram of a color TFT electrical system for a 208×RGB×160 display.

FIG. 29 shows an alternative embodiment of the present teachings of a 208×RGB×160 TFT display comprising a TFT substrate 2000, a column demultiplex circuit 2001, a row demultiplex circuit 2002, a pixel array 2003 and various signals (2004-2011) for driving the TFT circuits on the substrate 2000 described below.

Sixteen CA lines 2004 and thirty-nine CS lines 2005 are used to drive the column demultiplex circuit 2001. In this embodiment, 624 column lines can be written in a sequence of column write operations by modulating the CA 2004 and CS 2005 lines.

Four RS lines 2007, sixteen RA lines 2008, twenty RB lines 2009, one RG line 2010 and two DC lines 2001 are used to drive the row demultiplex circuit 2002 which in turn generates 320 wires for driving the pixel array 2003. The row demultiplex drive signals (2007-2011) can be preferentially driven to perform a row write operation to store the information on the column lines into the pixel array 2003 as well a perform periodic row exchange operations to mitigate accumulated stress in the TFTs of the pixel array 2003.

In FIG. 29, additional COM lines 2006 provide a common reference to the pixel array 2003 and LCD backplate (not shown).

Figure 30:
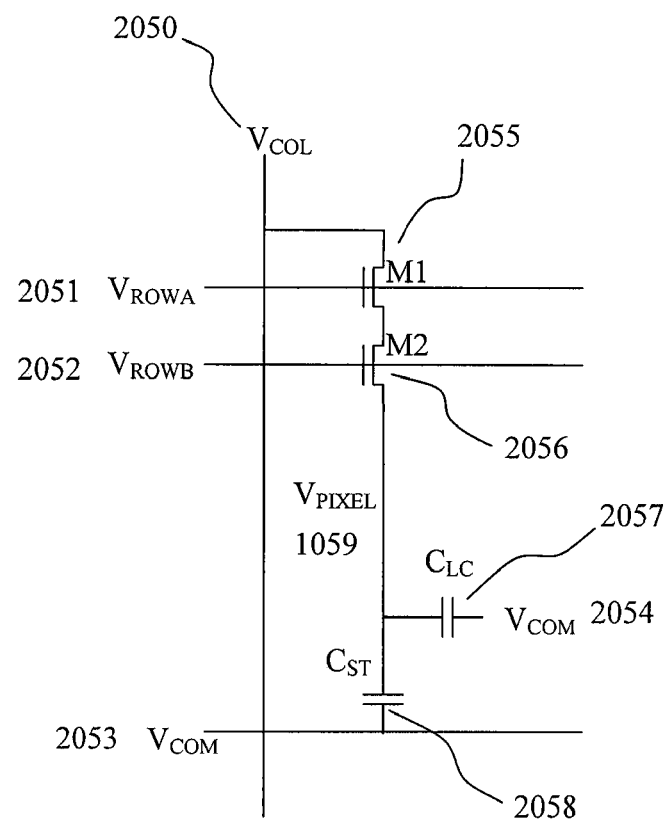
FIG. 30 shows a representative TFT pixel circuit schematic.

FIG. 30 shows an alternative embodiment of a TFT pixel circuit according to the present teachings comprising a column line $V_{COL}$ 2050, two row lines $V_{ROWA}$ 2051 and $V_{ROWB}$ 2052, a first series pass transistor M1 2055, a second series pass transistor M2 2056, a liquid crystal cell CLC 2057, a storage capacitor CST 2058, a common line VCOM 2053 connected to the storage capacitor CST 2058 and a common line 2054 connected to the liquid crystal capacitance CLC 2057. The two pass transistors M1 2055 and M2 2056 are connected in series to form a gated conduction path from VCOL 2050 to VPIXEL 2059. Charge storage capacitors CST 2058 and CLC 2057 connect VPIXEL 2059 to VCOM 2053 2054.

The pixel voltage VPIXEL 2059 is written to the cell by holding the VCOM lines 2053 2054 in a high or low state, storing a voltage on the column line VCOL 2050 which is connected to the source of M1 2055. M1 is activated by pulsing its gate, VROWA 2051, to a high potential while simultaneously pulsing the gate of M2 2056, VROWB 2052, to a high potential to increase the electrical conduction from VCOL 2050 to VPIXEL 2059 through the series connection of M1 2055 and M2 2056. Electrical charge is stored on the VPIXEL 2059 node and isolated from leaking away by maintaining at least one of the row gate lines VROWA 2051 or VROWB 2052 at a negative potential. The pixel charge is stored relative to VCOM 20522054 on both CST 2058 and CLC 2057.

Figure 31:
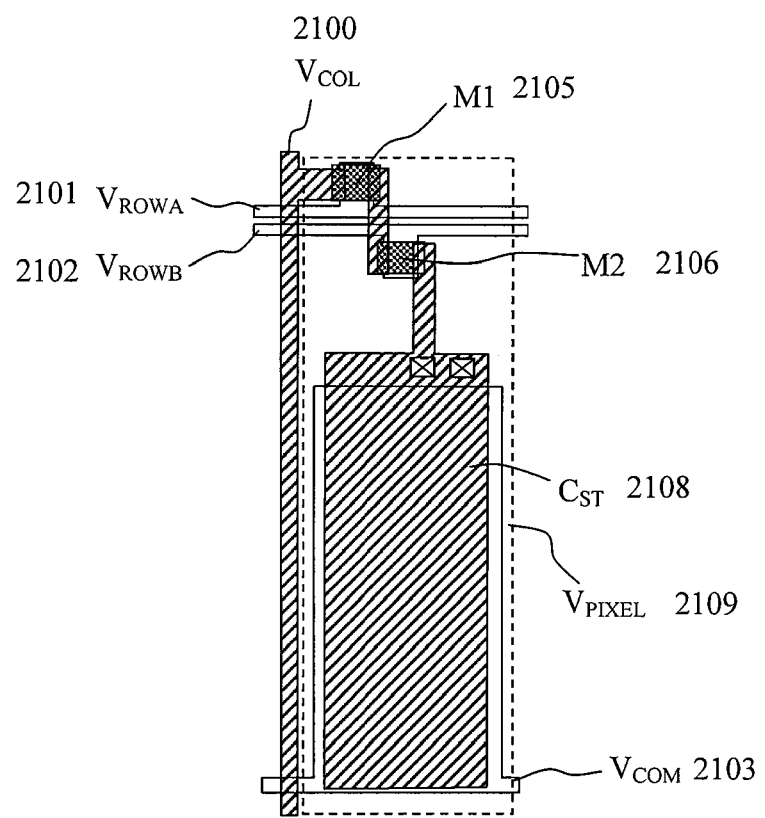
FIG. 31 shows a representative TFT pixel circuit layout.

FIG. 31 shows an alternative embodiment of the layout of the pixel circuit shown in FIG. 30. A column line VCOL 2100 preferably made of deposited metal runs vertically through the pixel and is connected to the source of transistor M1 2105. The gate of M1 2105 is connected to VROWA 2101. The drain of M1 2105 is connected to the source of M2 2106. The gate of M2 is connected to VROWB 2102. The drain of M2 is connected to a storage capacitor CST 2108 and pixel storage node VPIXEL 2109. The storage capacitor CST 2108 is also connected to the common backplate voltage VCOM 2103.

Those skilled in the art will recognize the wide variety of possible layout configurations of the pixel of the present teachings. The present teachings can be modified to route the column and row lines through or around the cell in many different ways that do not alter the electrical connectivity or operation of the pixel circuit. Additionally, the arrangement of the storage capacitor (shown below the pass transistors in FIG. 31) can be varied to accommodate any number of configuration requirements and manufacturing requirements. The transistors M1 2105 and M2 2106 may be divided into subunits while maintaining the function of the concepts described herein. The storage capacitor CST 2108 may also be divided into multiple sections while maintaining the electrical purpose as described in the present teachings. In the preferred embodiment, an RGB stripe configuration is adopted, although the present teachings can be generally applied to any pixel arrangement, including without limitation RGB delta configurations, RGBW configurations and any other subpixel arrangements as are well known in the art. Such modifications to the layout and circuit schematic are commonly done to meet application requirements and are considered within the scope of the present teachings.

Figure 32:
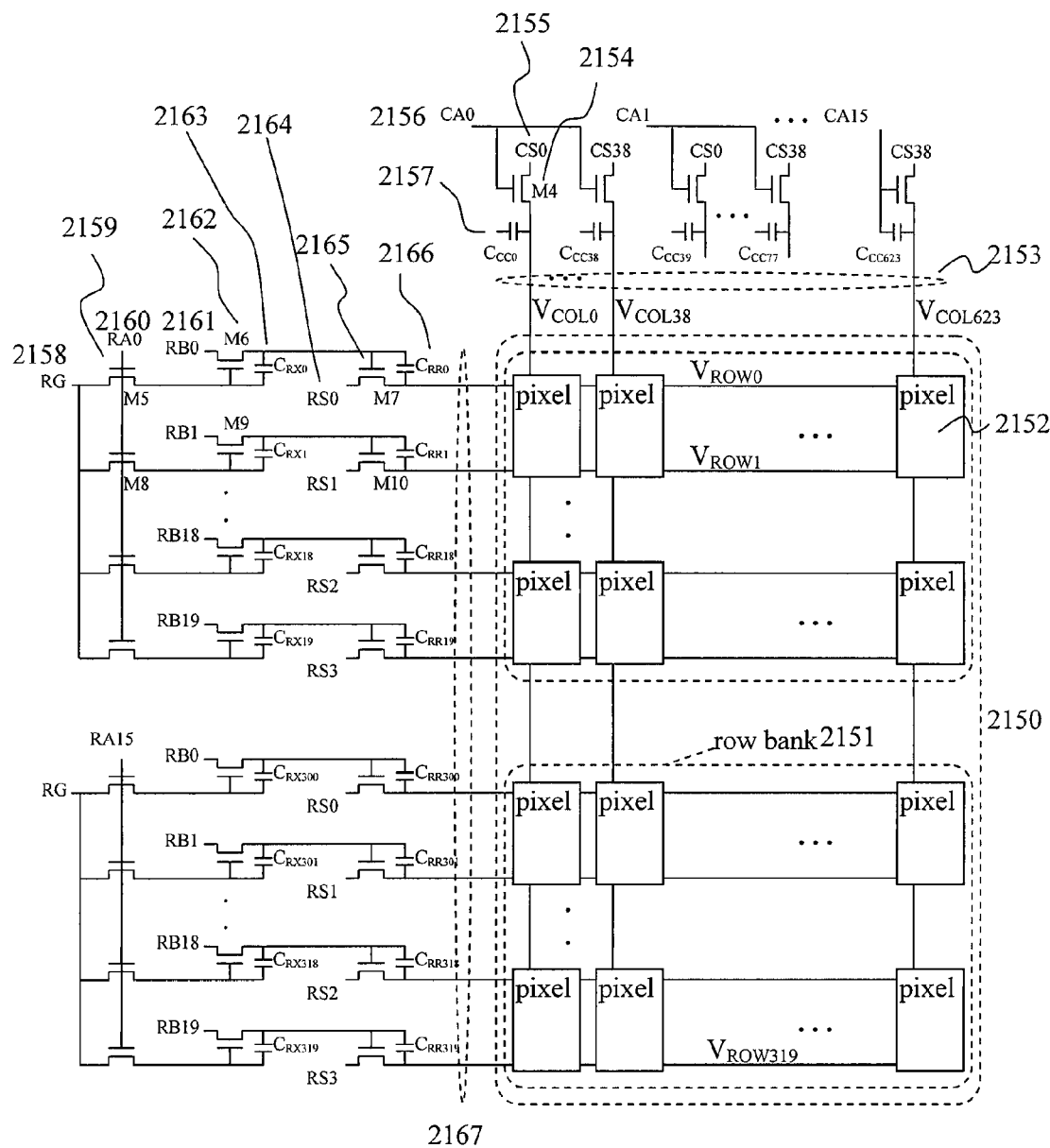
FIG. 32 shows a representative TFT display circuit schematic for a 208×RGB×160 display.

FIG. 32 shows an embodiment of the TFT display circuit comprising a pixel array 2150 which contains sixteen row banks 2151 of pixels 2152. The pixels are connected by row lines 2167 and column lines 2153 that are driven from the edge of the pixel array 2003 2150. The column demultiplex circuit 2001 is comprised of a number of pass transistors M4 2154 that are arranged so that each combination of one of sixteen CA lines 2156 and one of thirty-nine CS lines 2155 connect to the gate and source of a M4 transistor 2154 (624 in all) that have their drains connected to the 624 column lines 2153 driving in to the pixel array 2150 2003. By modulating the gate 2156 and source 2155 of M4, a column voltage can be stored on capacitance CCC0 2157 that represents the desired pixel information for a given row of pixels 2152.

FIG. 32 also shows a row demultiplex circuit which is comprised of six transistors per row of pixels. RG line 2158 is connected to the sources of M5 2160 and M8 which drive the gates of M6 2162 and M9 respectively. A storage capacitor CRXn 2163 stores the charge deposited by M5 2160 between the drain of M6 2162 and the gate of M6 2162. Each row line (of 320 in this embodiment) has an equivalent storage capacitor CRXn 2163 that bootstraps the gate voltage of M6 2162 during subsequent operations. The source of M6 2162 is driven by signal RB0 2161. The drain of M6 drives the gate of M7 2165 and an additional storage capacitor CRR0 2166 between the drain of M7 2165 and the row line into the array 2167. The source of M7 2165 is driven by signal RS0 2164. All combinations of the sixteen RA lines 2160 and the ten pairs of RB lines 2161 generate 160 pairs of row lines 2167 going into the pixel array 2150. Each RA line 2160 selects a single row bank 2151.

Figure 33:
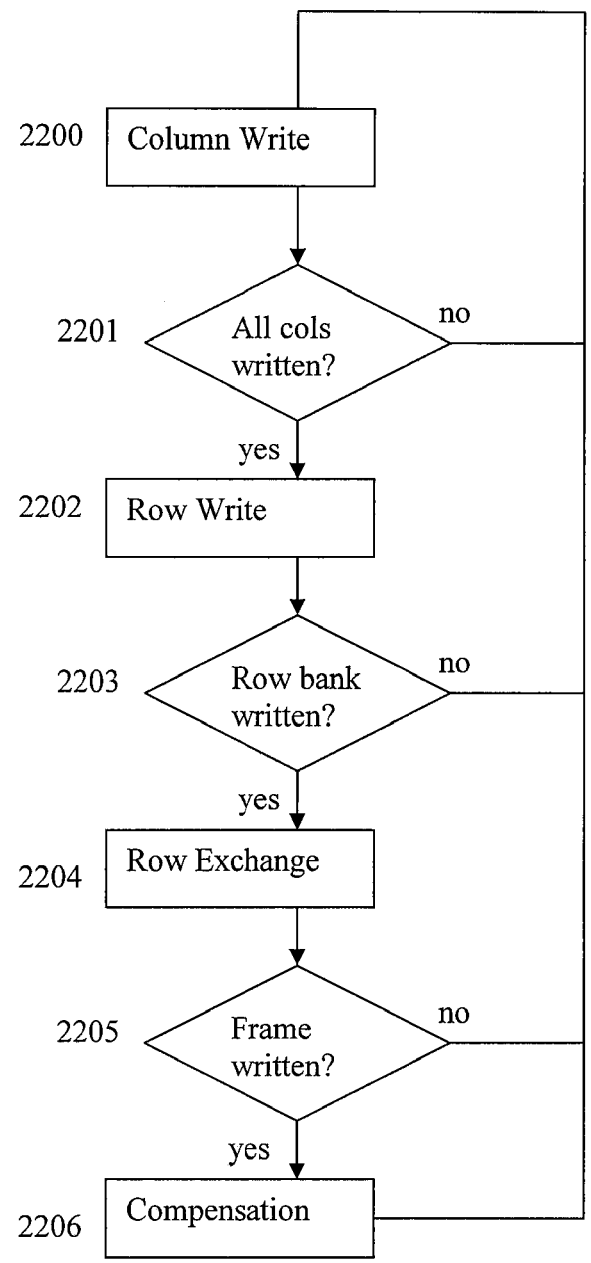
FIG. 33 shows a representative operational flowchart for a TFT display.

FIG. 33 shows the operational flow chart of this embodiment. A column write operation 2200 comprises driving the CA 2156 and CS 2155 lines to demultiplex and store 624 desired pixel voltages for a given row on the column capacitances CCC0 2157. When the column write operation 2200 is completed (decision 2201) a row write operation 2202 drives a selected pair of row lines 2167 into the pixel array 2150 to capture the column voltages stored during the column write operation 2200 into a selected row of pixels 2152. At the end of the row write operation 2202, the selected row's pair of lines are electrically floated, one at a higher voltage and one at a lower voltage to prevent charge leakage from the pixels 2152 that have just been written. The lower of these two resting voltages is chosen to prevent charge leakage from the pixel cell 2152. The higher of these two resting voltages is chosen to prevent negative bias stress accumulation on the pixel transistors (e.g. M1 2055 and M2 2056 of FIG. 30).

Once an entire bank of pixels 2151 is written (decision 2203) a row exchange operation 2204 is performed. The row exchange operation 2204 first lowers the voltage of all of the higher resting row lines 2167 then raises all of the voltages of the previously lower row lines 2167 to the higher resting voltage. By alternating the pixel transistors between the lower charge retention gate voltage and the higher stress reduction voltage at a rate higher than the frame rate of the panel, the frame rate can be lowered substantially without incurring negative stress bias that can substantially reduce panel lifetime. By lowering the frame rate, a substantial savings in power dissipation can be achieved.

Once the entire frame is written (decision 2205) a compensation operation 2206 can be optionally added to measure various TFT transistor and operational performance parameters that can be used to adjust drive voltages and/or temporal modulation of the driving waveforms to improve, among other things, uniformity, contrast, power dissipation, stress reduction, lifetime and other desirable qualities of the display.

Figure 34:
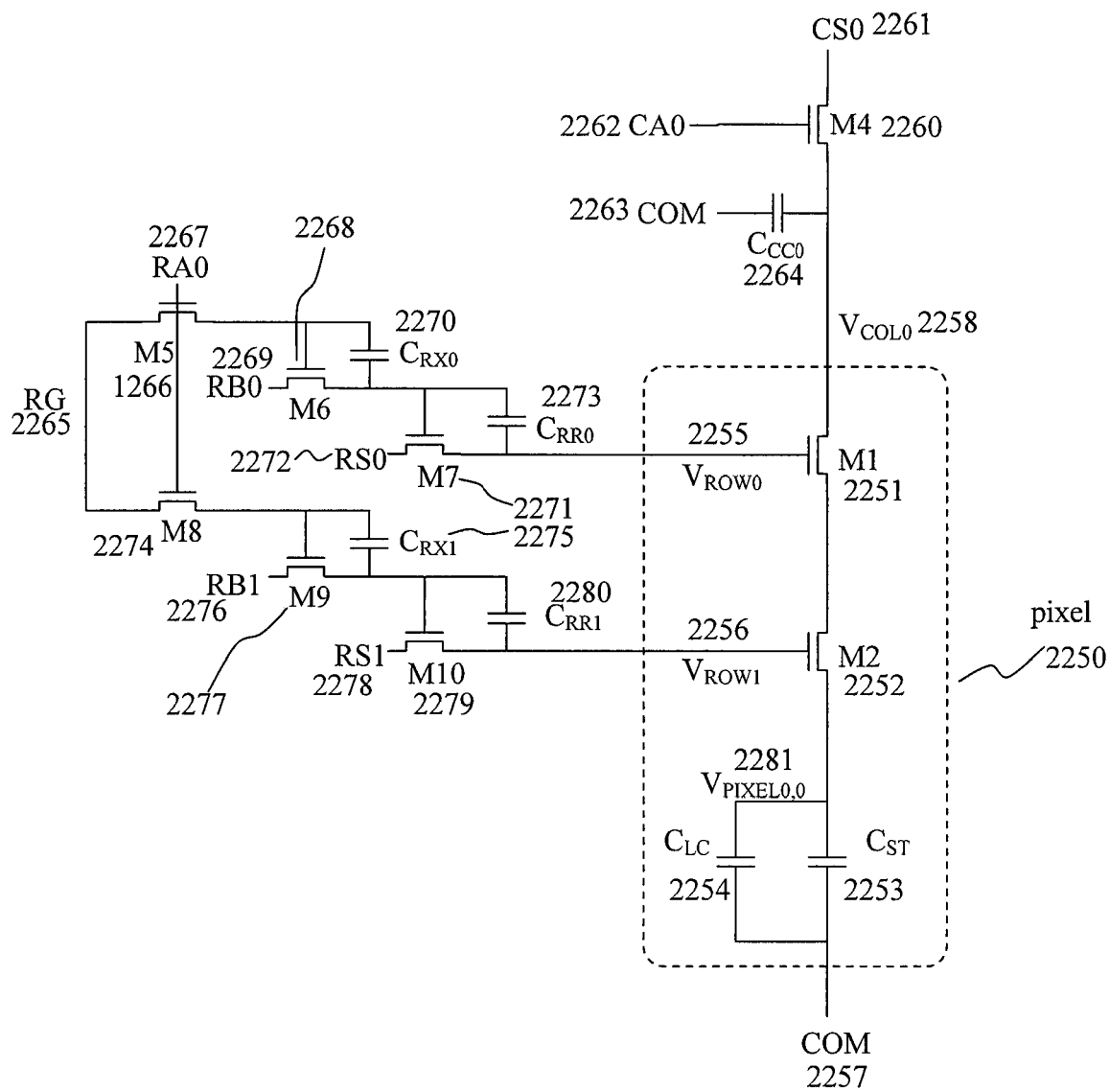
FIG. 34 shows a representative simplified schematic of one TFT display pixel and its associated row and column demultiplex circuitry.

FIG. 34 shows a detailed circuit diagram containing the operational elements as seen by a single pixel 2250. The two series transistor pass gates, M1 2251 and M2 2252, can allow current to flow between the column line VCOL0 2258 and the pixel storage node VPIXEL0,0 2281 when both gates VROW0 2255 and VROW1 2256 are driven to a high voltage. When at least one of the two pass transistors M1 2251 and M2 2252 have negative gate voltages the pixel voltage VPIXEL0,0 2281 is electrically isolated (except for a small leakage current) from the column line VCOL0 2258. The pixel storage node VPIXEL0,0 2281 is connected by two capacitors CLC 2254 and CST 2253 to the COM line 2257.

The column demultiplex circuit for a single column comprises a pass transistor M4 2260 that connects a CS line 2261 at its source to a column line VCOL0 2258 at its drain. A parasitic capacitance CCC0 2264 to other nodes, mainly COM 2263, stores charge that is gated by M4 2260 during a column write operation 2200. The gate of M4 2260 is connected to a CA0 line 2262.

The row demultiplex circuit for a single row comprises six TFTs. Drive signal RG 2265 is connected to the sources of M5 2266 and M8 2274. The gates of M5 2267 and M8 2274 are driven by one of the sixteen row bank select signals RA0 2267. The drain of M5 2266 drives the gate of transistor M6 2268 and storage capacitor CRX0 2270. The source of M6 2268 is driven by one of the twenty RB signals, RB0 2269. The gate storage capacitor CRX0 2270 is connected between the gate and drain of M6 2268. The drain of M6 2268 is further connected to the gate of M7 2271 which has its source driven by RS0 2272 and drain connected to the row line VROW0 2255. The gate storage capacitor CRR0 2273 is connected between the gate and drain of M7 2271.

The drain of M8 2274 drives the gate of M9 2277 whose source is connected to drive signal RB1 2276. The gate storage capacitor CRX1 2275 is connected between the gate and drain of M9 2277. The drain of M9 2277 further drives the gate of M10 2279 whose source is driven by drive signal RS1 2278. The gate storage capacitor CRR1 2280 is connected between the gate and drain of M10 2279. The drain of M10 2279 drives the row line VROW1 2256 into the pixel 2250.

Figure 35:
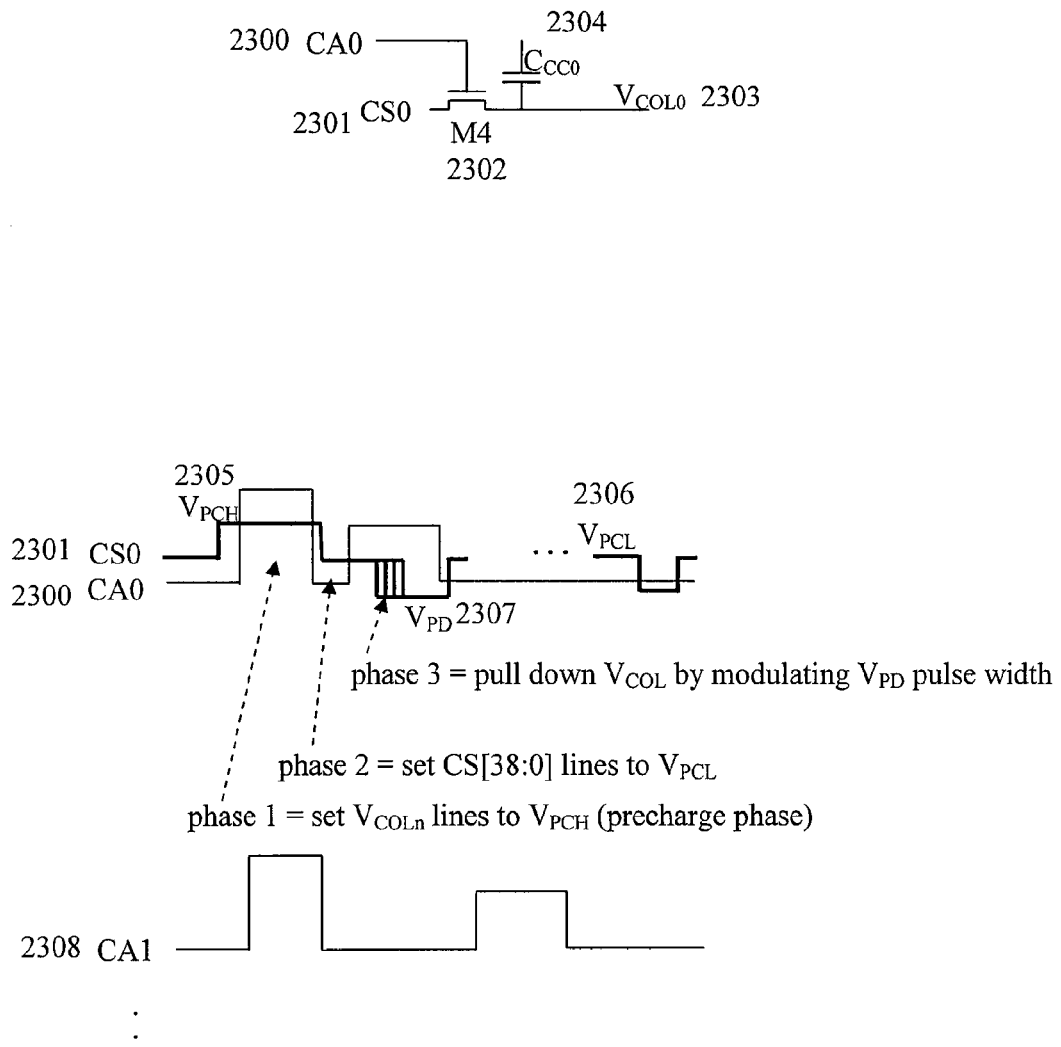
FIG. 35 shows a TFT display column demultiplex circuit and its associated waveforms during a column write operation.

FIG. 35 shows a representative waveform and subcircuit of the column demultiplex operational waveforms. The column write operation 2200 is accomplished in 3 phases. In the first phase, the column source signal CS0 2391 is raised to a high precharge voltage VPCH 2305 and all of the sixteen column gate signals CA0 2300 are pulsed to a high voltage. This precharges the VCOL0 node 2303 (and all 623 similar node) to the VPCH 2305 voltage by the conduction of M4 2302 from source to drain. During the second phase of the column write operation, all of the CS lines, in this case the CS0 line 2301, are pulled to a mid level voltage VPCL 2306 in preparation for third phase. During the third phase a single column select signal CA0 2300 is activated to a mid level gate voltage. The column source lines are then pulse width modulated (PWM) with pixel information between VPCL 2306 and VPD 2307 which is a voltage level low enough to cause relatively high conduction in M4 2302. By time modulating the "on" time of M4, a desired voltage can be achieved on VCOL0 2303 and stored by storage capacitor 2304. Subsequent CA select lines 1004 are pulsed (e.g. CA1 2308) to write alternative column lines.

Figure 36:
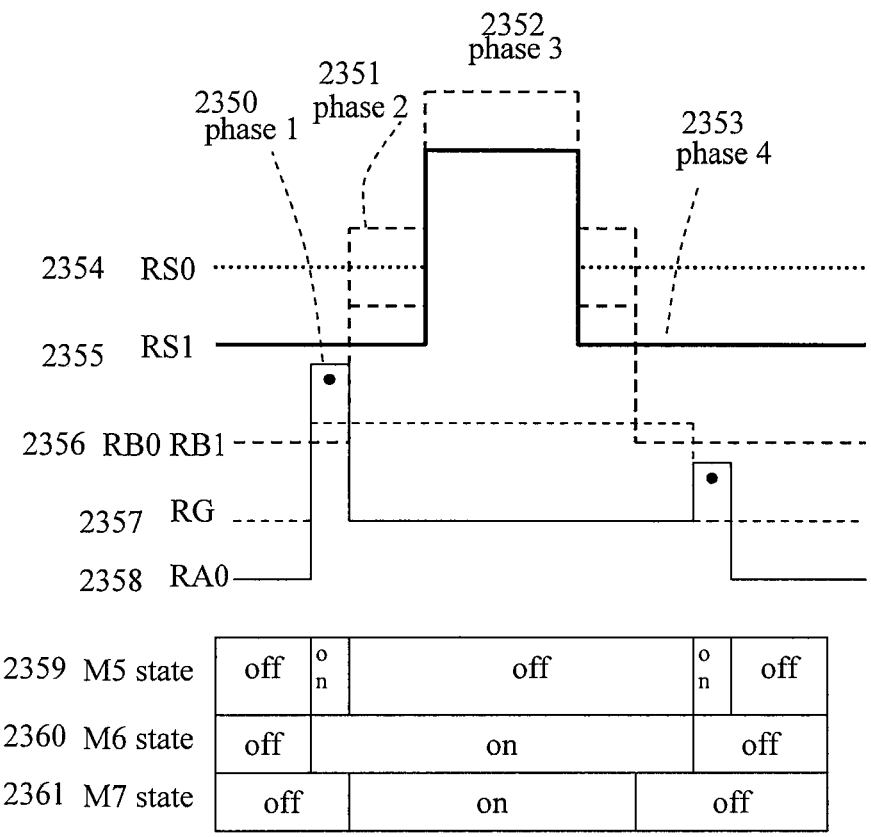
FIG. 36 shows electrical drive waveforms of a TFT row demultiplex circuit during a row write operation.

FIG. 36 shows the voltage waveforms of a row write operation which is described in four phases. In the first phase 2350, the RG signal 2357 and the RA0 signal 2358 are driven so that M5 2266 and M8 2274 can conduct and drive a desired voltage onto the gates of M6 2268 and M9 2277. At the end of the first phase 2350 the RA0 signal 2358 is lowered turning M5 2266 and M8 2274 "off". As a result a voltage is stored on the gates of M6 2268 and M9 2277 that is sufficient for significant conduction, i.e. they have been selected to the "on" state as shown in state timeline 2359. Both M6 2268 and M9 2277 are turned to the "on" state as well as shown in state timeline 2360.

In the second phase 2351 of FIG. 36, the RB0 and RB1 lines 2356 are driven to a sufficiently high voltage to activate M7 2271 and M10 2279.

In the third phase 2352 of FIG. 36, the RB0 and RB1 2356 lines as well as the RS0 2354 and RS1 lines 2355 are driven to high potential so that the row lines VROW0 2255 and VROW1 2256 are driven to a high voltage due to the "on" state of M7 2271 and M10 2279. By pulsing the row gates VROW0 2255 and VROW1 2256 the column voltage VCOL0 2258 is driven onto the pixel storage node VPIXEL0,0 2281 as desired. Row lines 2167 that did not have both the corresponding RA 2267 selection and RB 2269 selection activated maintain a low potential since they are not driven. In this way a single row of pixels can be selected.

In the fourth phase 2353 of FIG. 36, the RS0 2354 and RS1 2355 are reduced to two resting voltages. RB0 and RB1 2356 are also reduced to turn off M7 2271 and M10 2279 as shown in state timing diagram 2361. At the end of the fourth phase 2353, the RA0 signal 2358 is pulsed above a lowered RG voltage 2357 so that M6 2268 and M9 2277 are turned to an "off" state, which is stored on gate storage capacitors CRX0 2270 and CRX1 2275 respectively. In the last step, the RA0 signal 2358 is reduced to a low voltage to turn M5 2266 and M8 2274 "off" as well.

Figure 37:
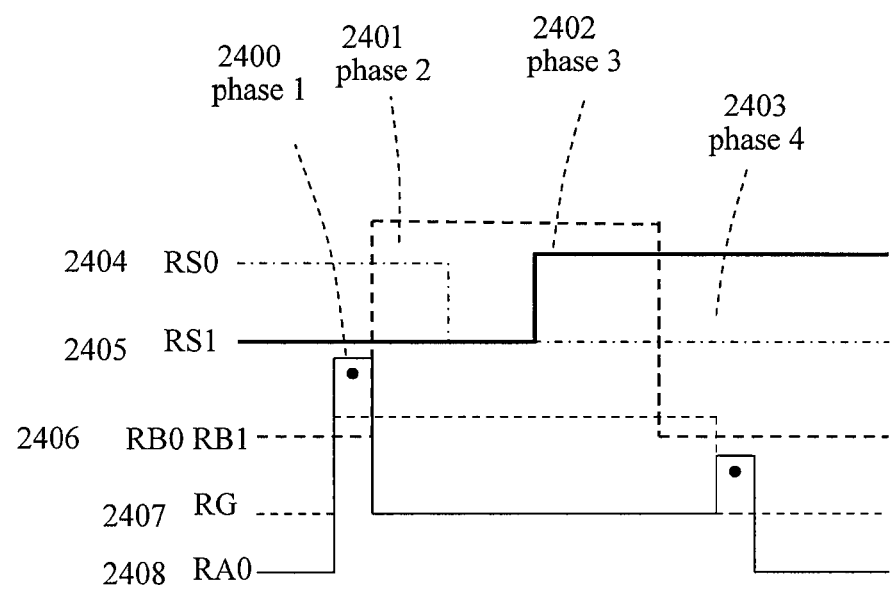
FIG. 37 shows electrical drive waveforms of a TFT row demultiplex circuit during a row exchange operation.

FIG. 37 shows representative voltage waveforms of a row exchange operation 2204. In the first phase 2400, the RS0 2404 and RS1 2405 lines are set at the expected internal row voltages. The RA0 2408 and RG 2407 lines are pulsed in a similar fashion to the first phase described in FIG. 36 so that one or more row banks 2151 are selected. In the second phase, the RB0 and RB1 2406 lines are raised so that M6 2269, M9 2277, M7 2271 and M10 2279 all conduct. The RS line at the higher resting potential (in this example RS0 2404) is lowered to the lower resting voltage. Between the second 2401 and third 2402 phases a charging time is allowed so that the row lines to the array 2167 can settle to both being at the lower resting potential. In the third phase, the RS line (in this example RS1 2405) that was originally at the lower resting voltage is raised to the higher resting voltage. In the fourth phase 2403, the RB0 and RB1 2406 lines, the RG 2407 line and RA0 2408 lines are reduced so that the transistors in the row demultiplex circuit are returned to a resting "off" state.

The row exchange operation 2204 can operate on multiple banks simultaneously. In a preferred embodiment, the rows are written with pixel voltages alternatively above and below the COM voltage level. As a consequence, "above" and "below" rows of pixels will have different requirements for resting row voltages. It is often advantageous to break up the row exchange operation into additional phases (not shown) that address subsets of the row signals 1167 that have common voltage levels. Such modifications are dependent on application design choices and are within the scope of the present teachings.

The invention claimed is:

1. A method of operating a display circuit, wherein the display circuit comprises a plurality of pixel circuits, each pixel circuit comprising at least two transistors in series connected to a pixel of a Liquid Crystal Display (LCD), the method comprising:
   performing frame loading operations, wherein each frame loading operation updates a display image of the LCD; and
   between frame loading operations, for each pixel circuit, holding a charge of the corresponding LCD pixel,
   wherein to hold a charge of a LCD pixel of a pixel circuit between frame loading operations a negative gate bias voltage is alternately applied to the transistors of said transistors in series of the pixel circuit, and when the negative gate bias voltage is applied to a least one transistor of said transistors in series of the pixel circuit, a positive gate bias voltage is applied to the at least one other transistor of said transistors in series of the pixel circuit, thereby applying a positive stress to compensate for negative stress accumulated on said at least one other transistor of said transistors in series when the negative gate bias is applied,
   wherein said negative gate bias voltage and positive gate bias voltage are alternately applied between frame loading operations to each one of said transistors in series.

2. The method of claim 1, further comprising alternately applying the negative gate bias voltage and the positive gate bias voltage to one of the transistors of said transistors in series of the pixel circuit at a rate of 60 Hz or greater.

3. The method of claim 1, wherein performing a frame loading operation comprises, for each pixel circuit:

applying a positive gate bias voltage to each transistor of said transistors in series of the pixel circuit to form a conduction path through the transistors to the corresponding LCD pixel; and sending a charge through the conduction path to the LCD pixel to charge the corresponding LCD pixel.

4. The method of claim 1, wherein the display circuit comprises a plurality of row and column select transistors connected to the pixel circuits, the method further comprising performing frame loading operation, wherein each frame loading operation updates a display age of the LCD and comprises applying gate bias voltages to the row and column select transistors; and between frame loading operations, applying a negative gate bias to the row and column select transistors, thereby applying negative stress to compensate for positive stress accumulated on said row and column select transistors during the frame loading operations.

5. The method of claim 4, further comprising:

periodically measuring threshold voltage shifts in the row and column select transistors; and adjusting the amount of negative stress applied to the row and column select transistors based on the measured threshold voltage shifts.

6. The method of claim 5, wherein adjusting the amount of negative stress comprises adjusting an amount of time that a negative voltage is applied to the row and column select transistors.

7. The method of claim 5, wherein adjusting the amount of negative stress comprises adjusting a waveform of a negative voltage applied to the row and column select transistors.

8. A display circuit for a pixel array, comprising:

a row and column driver; and a plurality of pixel circuits coupled to the row and column driver, wherein each pixel circuit comprises at least two transistors in series connected to a pixel of a Liquid Crystal Display (LCD);

wherein the row and column driver is configured to load a frame onto the LCD by applying positive voltages to the transistors of said transistors in series of the pixel circuits to form conduction paths to the pixels of the LCD and sending charges to the pixels through the conduction paths, and between frame load operations, for each pixel circuit, to alternately apply a negative gate bias voltage to one of the transistors of said transistors in series of the pixel circuit to hold the charge of the corresponding LCD pixel, and when the negative gate bias voltage is applied to a least one transistor of said transistors in series of the pixel circuit, a positive gate bias voltage is applied to the at least one other transistor of the pixel circuit, thereby applying a stress reducing voltage to the at least one other transistor of said transistors in series of the pixel circuit, wherein said negative gate bias voltage and positive gate bias voltage are alternately applied between frame loading operations to each one of said transistors in series.

9. The display circuit of claim 8, wherein the row and column driver is configured to apply the negative gate bias voltage to one of the transistors of said transistors in series of the pixel circuit at a rate of 60 Hz or greater.

10. The display circuit of claim 8, wherein the row and column driver is configured to update the frame of the LCD at a rate of 200 milliseconds or slower.

11. The display circuit of claim 8, wherein the row and column driver is configured to update the frame of the LCD at a rate of one second or slower.

12. The display circuit of claim 8, wherein transistors comprise amorphous silicon hydrogenated thin film transistors (a-Si:H TFT).

* * * * *